(12) United States Patent  
Neal et al.

(10) Patent No.: US 7,988,292 B2  
(45) Date of Patent: *Aug. 2, 2011

(54) SYSTEM AND METHOD OF MEASURING AND MAPPING THREE DIMENSIONAL STRUCTURES

(75) Inventors: Daniel R. Neal, Tijeras, NM (US); Richard James Copland, Albuquerque, NM (US); David A. Neal, Albuquerque, NM (US)

(73) Assignee: AMO Wavefront Sciences LLC., Santa Ana, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/474,607

(22) Filed: May 29, 2009

(65) Prior Publication Data

US 2009/0284753 A1 Nov. 19, 2009

Related U.S. Application Data

(60) Continuation of application No. 11/829,184, filed on Jul. 27, 2007, now Pat. No. 7,553,022, which is a division of application No. 10/828,550, filed on Apr. 21, 2004, now Pat. No. 7,455,407, which is a continuation-in-part of application No. 10/369,513, filed on Feb. 21, 2003, now Pat. No. 6,908,196, and a continuation-in-part of application No. 10/419,072, filed on Apr. 21, 2003, now abandoned, which is a continuation of application No. 09/692,483, filed on Oct. 20, 2000, now Pat. No. 6,550,917.

(60) Provisional application No. 60/182,088, filed on Feb. 11, 2000.

(51) Int. Cl.  
*A61B 3/10* (2006.01)

(52) U.S. Cl. ......... 351/221; 351/246; 351/212; 351/216
(58) Field of Classification Search ................. 351/246, 351/221

See application file for complete search history.

(56) References Cited

U.S. PATENT DOCUMENTS

| | | |
|---|---|---|
| 3,819,256 A | 6/1974 | Bellows et al. |
| 4,021,102 A | 5/1977 | Iizuka |
| 4,725,138 A | 2/1988 | Wirth et al. |
| 5,048,935 A | 9/1991 | Efron et al. |
| 5,136,413 A | 8/1992 | MacDonald et al. |

(Continued)

FOREIGN PATENT DOCUMENTS

DE 4222395 A1 1/1994

(Continued)

OTHER PUBLICATIONS

Joseph M. Geary; Introduction to Wavefront Sensors; SPIE Press, vol. TT18, pp. 93-95, USA.

(Continued)

*Primary Examiner* — Jessica T Stultz

(57) ABSTRACT

A system for mapping a three-dimensional structure includes a projecting optical system adapted to project light onto an object, a correction system adapted to compensate the light for at least one aberration in the object, an imaging system adapted to collect light scattered by the object and a wavefront sensor adapted to receive the light collected by the imaging system and to sense a wavefront of the received light. For highly aberrated structures, a number of wavefront measurements are made which are valid over different portions of the structure, and the valid wavefront data is stitched together to yield a characterization of the total structure.

4 Claims, 17 Drawing Sheets

U.S. PATENT DOCUMENTS

| | | | |
|---|---|---|---|
| 5,258,791 | A | 11/1993 | Penney et al. |
| 5,493,391 | A | 2/1996 | Neal et al. |
| 5,617,157 | A | 4/1997 | Shalon et al. |
| 5,777,719 | A | 7/1998 | Williams et al. |
| 5,929,970 | A | 7/1999 | Mihashi |
| 5,936,720 | A | 8/1999 | Neal et al. |
| 5,978,053 | A | 11/1999 | Giles et al. |
| 5,991,102 | A | 11/1999 | Oono et al. |
| 6,042,233 | A | 3/2000 | Mihashi et al. |
| 6,052,180 | A | 4/2000 | Neal et al. |
| 6,095,651 | A | 8/2000 | Williams et al. |
| 6,130,419 | A | 10/2000 | Neal |
| 6,199,986 | B1 | 3/2001 | Williams et al. |
| 6,234,978 | B1 | 5/2001 | Mihashi et al. |
| 6,270,221 | B1 | 8/2001 | Liang et al. |
| 6,271,914 | B1 | 8/2001 | Frey et al. |
| 6,271,915 | B1 | 8/2001 | Frey et al. |
| 6,299,311 | B1 | 10/2001 | Williams et al. |
| 6,382,795 | B1 | 5/2002 | Lai |
| 6,394,605 | B1 | 5/2002 | Campin et al. |
| 6,452,145 | B1 | 9/2002 | Graves et al. |
| 6,547,395 | B1 | 4/2003 | Neal et al. |
| 6,550,917 | B1 | 4/2003 | Neal et al. |
| 7,419,264 | B1 | 9/2008 | Otten et al. |
| 7,455,407 | B2 * | 11/2008 | Neal et al. ............ 351/221 |
| 7,553,022 | B2 * | 6/2009 | Neal et al. ............ 351/246 |

FOREIGN PATENT DOCUMENTS

| | | |
|---|---|---|
| EP | 0373788 A2 | 6/1990 |
| EP | 0625332 A2 | 11/1994 |
| WO | 8302716 | 8/1983 |
| WO | 0128408 A2 | 4/2001 |
| WO | 0178585 A2 | 10/2001 |
| WO | 0182228 A2 | 11/2001 |
| WO | 0189372 A1 | 11/2001 |

OTHER PUBLICATIONS

Margaret Brown et al., Measurement of the dynamic deformation of a high frequency scanning mirror using a Shack-Hartmann wavefront sensor; SPIE 46th Annual Meeting International Symposium on Optical Science and Technology, Jul. 29-Aug. 3 2000; pp. 1-9.

Daniel R. Neal et al.; AAIA 98-2701 Shack-Hartmann wavefront sensor testing of aero-optic phenomena; 20th AAIA Advanced Measurement and Ground Testing Technology Conference Jun. 15-18, 1998, pp. 1-13.

Daniel R. Neal et al.; Application of Shack-Hartmann Wavefront Sensors to Optical System Calibration and Alignment; pp. 234-241.

Daniel R. Neal et al.; Characterization of Infrared Laser Systems; SPIE 3437-05 (1998); pp. 1-11.

Daniel R. Neal et al.; Amplitude and phase beam characterization using a two-dimensional wavefront sensor; SPIE vol. 2870, 0-8194-2267-3/96; pp. 72-82.

Daniel R. Neal et al.; Use of beam parameters in optical component testing; 4451, pp. 394-405.

Daniel R. Neal et al.; Wavefront sensors for optical diagnostics in fluid mechanics; application to heated flow, turbulence and droplet evaporation; SPIE vol. 2005, 0-8194-1254-6/93; pp. 194-203.

Lindlein et al.; Algorithm for expanding the dynamic range of a Shack-Hartmann sensor by using spatial light modulator array; Optical Engineering, vol. 40 No. 5 May 2001; pp. 837-840.

Suzuki et al.; Error analysis of a Shack-Hartmann wavefront sensor; SPIE vol. 2443, 0-8194-1792-0/95; pp. 798-805.

Platt et al.; History and Principles of Shack-Hartmann Wavefront Sensing; Journal of Refractive Surgery, vol. 17, Sep./Oct. 2001; pp. S573-S577.

Lindlein et al.; Experimental results for expanding the dynamic range of a Shack-Hartmann sensor using astigmatic microlenses; Optical Engineering, vol. 41 No. 2, Feb. 2002; pp. 529-533.

Lindlein et al.; Dynamic range expansion of a Shack-Hartmann sensor by use of a modifed unwrapping algorithm; Optics Letter/vol. 23, No. 13/Jul. 1, 1998; pp. 995-997.

Lindlein et al.; Absolute sphericity measurement: a comparative study of the use of interferometry and a Shack-Hartmann sensor; Optics Letter/vol. 23, No. 10/ May 15, 1998; pp. 742-744.

Junzhong Liang et al., "Objective measurement of wave aberrations of the human eye with the use of a Hartmann-Shack wave-front sensor," Optical Society of America, vol. 11, Jul. 7, 1994, pp. 1949-1957.

* cited by examiner

SYSTEM AND METHOD OF MEASURING AND MAPPING THREE DIMENSIONAL STRUCTURES

CROSS-REFERENCES TO RELATED APPLICATIONS

This application is a continuation of application Ser. No. 11/829,184 filed on 27 Jul. 2007, and which issued on 30 Jun. 2009 as U.S. Pat. No. 7,553,022, which is a divisional of U.S. patent application Ser. No. 10/828,550, filed on 21 Apr. 2004, which issued on 25 Nov. 2008 as U.S. Pat. No. 7,455,407, which is in turn a continuation-in-part of U.S. patent application Ser. No. 10/369,513, filed on 21 Feb. 2003 and which was issued on 21 Jun. 2005 as U.S. Pat. No. 6,908,196, and is also a continuation-in-part of U.S. patent application Ser. No. 10/419,072, filed on 21 Apr. 2003 now abandoned which is in turn a continuation of U.S. patent application Ser. No. 09/692,483, filed on 20 Oct. 2000 and which issued on 22 Apr. 2003 as U.S. Pat. No. 6,550,917, which application in turn claims priority under 35 U.S.C. .sctn. 119 from U.S. Provisional Patent Application No. 60/182,088 filed on 11 Feb. 2000, the entire contents of each of which applications are hereby incorporated by reference in their entirety for all purposes as if fully set forth herein.

BACKGROUND AND SUMMARY

1. Field

This invention pertains to the field of measurement of surfaces of three-dimensional objects, and more particularly, to a system and method of measuring and mapping three-dimensional surfaces of spherical and aspherical objects, and of characterizing optically transmissive devices.

2. Description

There are a number of applications where the ability to provide a true measurement and map of a three-dimensional surface would be beneficial. There are also a number of applications where the ability to precisely and accurately determine characteristics (particularly one or more optical properties) of an optically transmissive device would be beneficial.

For example, contact lenses for correcting vision are produced using contact lens molds. Such contact lens molds may suffer not only from surface irregularities (small-scale features), but also may include large-area defects. Therefore, it would be desirable to provide a system and method of measuring and mapping a three-dimensional surface of a contact lens mold.

U.S. Pat. No. 6,550,917 ("the '917 patent"), from which this application claims priority, describes an improved system and method of compiling a topographic mapping of refractive errors in the eye. A disclosed system employs a wavefront sensor, such as a Shack-Hartmann wavefront sensor, and includes a combination of an adjustable telescope and a range-limiting aperture (RLA) to provide a high dynamic range measurement.

However, such a system cannot be directly applied to aspherical measurements of a contact lens mold, for example, because in most cases these elements are highly curved surfaces that cannot be probed with an injected beam system. Also, for measurements of the eye, the aberrations are known to vary according to specific classifications, such as defocus, astigmatism, coma or other higher order effects, and thus the ocular instrument could be designed a priori to deal individually with these different, known, types of aberrations.

The use of a wavefront sensor for optical metrology of optics, surfaces, optical systems, and the characterization of light beams is a well established art. Methods have been developed for: characterization of laser beams (e.g., U.S. Pat. No. 5,936,720; D. R. Neal et al., "Amplitude and phase beam characterization using a two-dimensional wavefront sensor," S.P.I.E. 2870 (July 1996) pp.72-82); measurement of optics (e.g., D. R. Neal et al., "Wavefront sensors for control and process monitoring in optics manufacture," S.P.I.E. 2993, pp. 211-220 (1997); J. Pfund et al., "Nonnull testing of rotationally symmetric aspheres: a systematic error assessment," Appl. Optics 40(4) pp. 439-446 (1 Feb. 2001); and M. Abitol, "Apparatus for mapping optical elements," U.S. Pat. No. 5,825,476); measurement of the eye and other ophthalmic systems (U.S. Pat. No. 6,550,917 (the '917 patent")); and for many other applications. If the light incident on a wavefront sensor is the result of reflection or scattering light from a surface, then the metrology or other characteristics of the surface can be determined.

In this art several different technologies have been developed for sensing the arriving wavefront of the incident light. Among these technologies are interferometry, Shack-Hartmann wavefront sensing, Moire' deflectometry, Shearing interferometry, phase-diversity, curvature and other sensors. Each of these different types of sensors has a specific dynamic range and accuracy, along with other requirements for proper functioning of the appropriate systems. The design and selection of the appropriate phase sensitive instrument depends upon the desired characteristics of the measurement system including the desired dynamic range and accuracy.

However, in many cases the requirements for dynamic range and/or accuracy exceed the ability of a particular measurement technology. For a case where a large dynamic range is needed, the accuracy of the measurement may be reduced. If the instrument is designed to meet a specific accuracy, then it will often have reduced dynamic range. Thus one or both elements of the metrology system (dynamic range or accuracy) must be compromised in order to achieve the desired result. For example, Pfund describes a non-null test of an asphere using a Shack-Hartmann wavefront sensor approach. However, he carefully limits the application to rotationally symmetric systems so that the instrument can be operated within the dynamic range of the system. Thus his device is of limited applicability to general aspherical shapes. Abitol attempts to overcome this difficulty by marking one lenslet differently from the others. This is done by eliminating the central lenslet from the pattern of lenslets. Greater dynamic range can be achieved by extrapolating the position of this spot outwards from this marked location. However, this does not solve the problem of spot overlap or gross aberration.

There have also been a number of other methods for extending the dynamic range of the wavefront sensor purely through analysis. For example M. C. Roggeman et al., "Algorithm to increase the largest aberration that can be reconstructed from Hartmann sensor measurements," Appl. Optics 37(20), pp. 4321-4329 (10 Jul. 1998) proposed a method for using image metrics from a separate camera to improve the dynamic range, and Pfund et al., "Dynamic range expansion of a Shack-Hartmann sensor by using a modified unwrapping algorithm," Opt. Letters 23, pp. 995-997 (1998) proposed a method for analyzing the Shack-Hartmann image by use of a modified unwrapping algorithm. While these concepts are useful (in fact, one such method that has particular advantages is disclosed in detail below), they do not solve the problem of spot crossover when large changes in the wavefront gradient need to be measured.

The '917 patent discloses a method for the measurement of the eye that includes, among other elements, an adjustable position optical system that provides for an extension of the dynamic range of a wavefront sensor for measurement of ocular systems. This method provided a means for adjusting a reference sphere through the movement of one optical element relative to another optical element, and thus providing a means for limiting the dynamic range of the wavefront that is incident upon the sensor. A means for finding the appropriate location of this sphere was provided through feedback from the sensor.

This system has the advantage of incorporating a very large dynamic range, while still providing excellent accuracy. In this instrument, the defocus term was subtracted optically so that the residual aberrations were within the dynamic range of the wavefront sensor. However, it was applicable primarily to ocular systems that i) permitted injection of a small diameter beam, and ii) had well separated aberrations where focus dominated the strength of other aberrations. For an arbitrary aspherical optic, these features are not necessarily present.

Accordingly, it would be advantageous to provide a system and method of measuring and mapping three-dimensional surfaces of spherical and aspherical objects. It would also be advantageous to provide such a system and method that operates with an improved dynamic range. Other and further objects and advantages will appear hereinafter.

The present invention is directed to a system and method of measuring and mapping three-dimensional structures.

In one aspect of the invention, a variable position optical system and a dynamic-range-limiting aperture are used, similar to that disclosed in the '917 patent, to ensure that a wavefront sensor operates always within its dynamic range. It is recognized that for an arbitrary optical device with strongly varying surface curvatures, it will not be possible to measure the entire element in a single operation (as it is for the ocular system using the system disclosed in the '917 patent). However, the inventors have recognized that, with different positions of the variable position optical system, it is possible to examine the entire surface of the element under test. Thus by systematically varying the position of the variable position optical system, it is possible to obtain measurements of the entire surface of the element under test, and then construct the measurement of a highly curved or aberrated element from these multiple individual measurements.

In another aspect of the invention, a system for controlling, directing, and modulating light is used to project light onto an element under test, collect the light reflected from this element, direct light through a dynamic-range-limiting aperture, and project this light onto a wavefront sensor. This system may include optical reformatting optics to appropriately reform the light from collimated to converging or diverging as needed for the element under test.

In another aspect of this invention, a series of wavefront measurements are "stitched" together using mathematical methods. Each of these measurements would be acquired using a different optical system aspect (such as focus, tilt or other systematically introduced reference aberration), in conjunction with a means for limiting the dynamic range of the wavefront incident on a wavefront sensor (beneficially, through a dynamic-range-limiting aperture), so that a series of accurate, independent measurements are acquired from the element under test. Using the a priori reference information, each individual measurement wavefront is corrected appropriately. These measurements may then be combined together to produce an overall measurement of the entire surface of the element under test using the mathematical methods disclosed herein.

Accordingly, in one aspect of the invention, a system for mapping a surface of a three-dimensional object, comprises: a projecting optical system adapted to project light onto an object; a pre-correction system adapted to compensate a light beam to be projected onto the object for aberrations in the object, the pre-correction system being positioned in between the projecting optical system and the object; an imaging system adapted to collect light scattered by the object; and a wavefront sensor adapted to receive the light collected by the imaging system.

In another aspect of the invention, a method of mapping a surface of an object, comprises: projecting a light beam onto an object; compensating the light beam to be projected onto the object for aberrations in the object; collecting light scattered by the object; and sensing a wavefront of the collected light scattered by the object.

In yet another aspect of the invention, a system for measuring an optical characteristic of an optically transmissive object, comprises: a projecting optical system which projects light through an optically transmissive object; a correction system adapted to at least partially compensate a light beam that has been projected through the object for at least one optical property of the object; an imaging system adapted to collect the light that has been projected through the object; and a wavefront sensor adapted to receive the light collected by the imaging system.

In another aspect of the invention, a method of measuring an optical quality of an optically transmissive object, comprises: projecting a light beam through an optically transmissive object; at least partially compensating the light beam that has been projected through the object for at least one optical property of the object; collecting the light beam that has been projected through the object; and sensing a wavefront of the collected light.

In another aspect of the invention, a method of mapping a surface of an object, comprises: (a) projecting a light beam onto a surface of an object; (b) collecting light scattered by a first portion of the surface of the object and rejecting light scattered by a second portion of the surface of the object; (c) sensing a wavefront of the collected light returned by the portion of the surface of the object; (d) repeating steps (a) through (c) for a plurality of different portions of the surface of the object that together span a target area of the surface of the object; and (e) stitching together the sensed wavefronts to produce a complete measurement of the target area of the surface of the object.

In another aspect of the invention, a method of measuring an optically transmissive object, comprises: (a) projecting a light beam through a portion of an object; (b) collecting light passed through the portion of the object; (c) sensing a wavefront of the collected light passed through the portion of the object; (d) repeating steps (a) through (c) for a plurality of different portions of the object that together span a target area of the object; and (e) stitching together the sensed wavefronts to produce a complete measurement of the target area of the object.

In another aspect of the invention, a method of mapping a surface of an object, comprises: (a) locating a light source a first distance from an object; (b) projecting a light beam from the light source onto a surface of the object; (c) collecting light scattered by the surface of the object; (d) sensing a wavefront comprising a difference between a wavefront of the collected light and a reference wavefront; (e) changing the distance between the light source and the object; (f) repeating steps (b) through (e) to produce N sensed wavefronts; and (g)

stitching together the N sensed wavefronts to produce a complete measurement of the target area of the surface of the object.

In another aspect of the invention, a method of measuring an optically transmissive object, comprises: (a) locating a light source a first distance from an optically transmissive object; (b) projecting a light beam from the light source through the object; (c) collecting light projected through the object; (d) sensing a wavefront comprising a difference between a wavefront of the collected light and a reference wavefront; (e) changing the distance between the light source and the object; (f) repeating steps (b) through (e) N times to produce N sensed wavefronts; and (g) stitching together the N sensed wavefronts to produce a complete measurement of the target area of the surface of the object.

In another aspect of the invention, a point light source for producing a spherical wave, comprises: a light source; a diffuser adapted to receive light from the light source; and a structure having an aperture adapted to receive and pass therethrough the light from the diffuser.

In another aspect of the invention, a method of determining when a portion of a light wavefront received by a wavefront sensor exceeds the dynamic range of the wavefront sensor, comprises: assigning a group of N pixels of a wavefront sensor to a focal spot; providing a first light wavefront to the wavefront sensor under conditions known to be within a dynamic range of the wavefront sensor; calculating a reference value, $\Phi_k^{REF}$, for a second moment of the focal spot produced by the first light wavefront within the group of N pixels; providing a second light wavefront to the wavefront sensor; calculating a value of the $\Phi_k$, for a second moment of the focal spot produced by the second light wavefront within the group of N pixels; and determining that the second light wavefront is within the dynamic range of the wavefront sensor within the group of N pixels when: $|\sigma_k - \sigma_k^{REF}| < t_\sigma$, where $t_\Phi$ is a set threshold value.

In another aspect of the invention, a method of mapping a surface of an object, comprises: projecting a light beam onto an object; compensating the light beam to be projected onto the object for aberrations in the object; passing light scattered by the object through a dynamic-range-limiting aperture; collecting light passed through the dynamic-range-limiting aperture; and sensing a wavefront of the collected light.

In another aspect of the invention, a method of determining a position of a focal spot on a wavefront sensor, comprises: assigning a first group of N pixels of a wavefront sensor to a focal spot; providing a light wavefront to the wavefront sensor; measuring an irradiance distribution of the light wavefront across the N pixels of the first group; calculating a preliminary centroid position of the focal spot as a first moment of the irradiance distribution of the light wavefront across the N pixels of the first group; assigning a second group of N pixels of the wavefront sensor to the focal spot, where the second group of N pixels is approximately centered at the preliminary centroid position; and calculating a location of the focal spot as a first moment of the power of irradiance distribution of the light wavefront across the N pixels of the second group.

In another aspect of the invention, a method of determining a wavefront of light received by a wavefront sensor, comprises: (a) providing a light wavefront to a wavefront sensor; (b) assigning pixels of the wavefront sensor to a first plurality of areas-of-interest (AOIs); (c) determining a first region of the wavefront sensor where the received light wavefront is within a dynamic range of the wavefront sensor for all AOIs within the first region; (d) calculating locations for centers of light spots of received light for all AOIs within the first region;
(e) calculated a fitted wavefront for the received light wavefront over the first region; (f) computing a slope of the fitted wavefront at each AOI within the first region; (g) projecting locations for centers of light spots of received light for a second region of the wavefront sensor larger than the first region, using the slopes of the fitted wavefront within the first region; (h) reassigning the pixels of the wavefront sensor to a second plurality of areas-of-interest (AOIs) each centered on one of the calculated or projected centers of light spots; (i) determining a new first region of the wavefront sensor where the received light wavefront is within a dynamic range of the wavefront sensor for all AOIs; and (j) repeating steps (d) through (i) until one of: (i) the new first region is no larger than a previous first region; and (ii) the new first region spans substantially the entire wavefront sensor.

In another aspect of the invention, a method of measuring a focal length (F) of a lens, comprises: (a) locating a light source on a first side of a lens, one of the light source and the lens being located at a position Zi; (b) locating a wavefront sensor a fixed distance (L) from the lens on a second side thereof; (c) projecting a light beam from the light source through the lens; (d) collecting light passed through lens; (e) sensing a wavefront of the collected light at the wavefront sensor; (f) measuring a corresponding vergence Pi of the light; (g) incrementing i by 1, and moving the position of one of the light source and the lens to a new position Zi; (h) repeating steps (c) through (g) to obtain N values of Zi and Pi; and (i) applying the N values of Zi and Pi to a least squares fit algorithm to solve for the focal length (F).

DETAILED DESCRIPTION

Figure 1A:
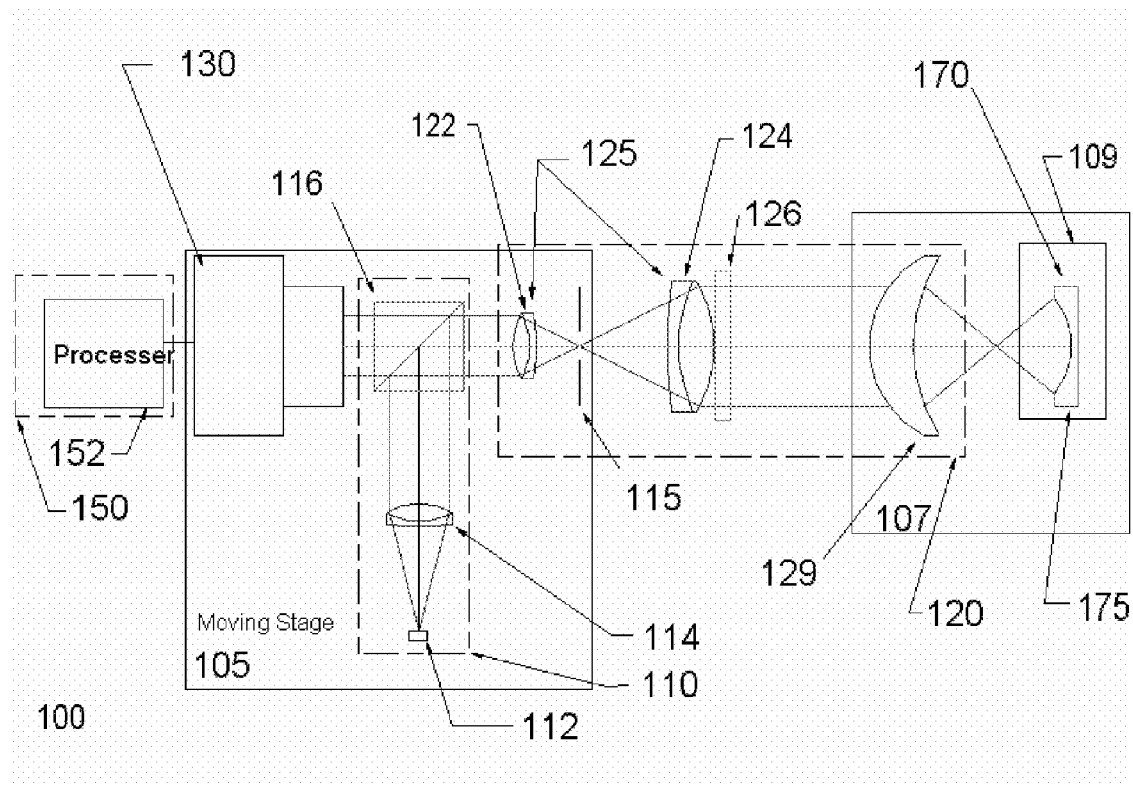
FIG. 1A is a functional block diagram of a system for measuring and mapping three-dimensional surfaces of spherical and aspherical objects.

FIG. 1 shows a functional block diagram of one embodiment of a system 100 for measuring and mapping three-dimensional surfaces of spherical and aspherical objects.

The system 100 includes: a projection system 110 comprising a light source 112, a collimating lens 114, and a polarizing beam splitter 116; an optical imaging system 120 comprising lens pair 122 and 124 (operating together as a telescope 125), dynamic-range-limiting aperture (RLA) 115, λ/4 waveplate 126, and reformatting lens 129; a wavefront sensor 130; and a data analysis system 150 including a processor 152. Beneficially, the system also includes one or more movable stages—in particular the system 100 includes three movable stages 105, 107, and 109—on each of which one or more components may be mounted. The purposes and function of the movable stages will be explained in further detail below.

Figure 1B:
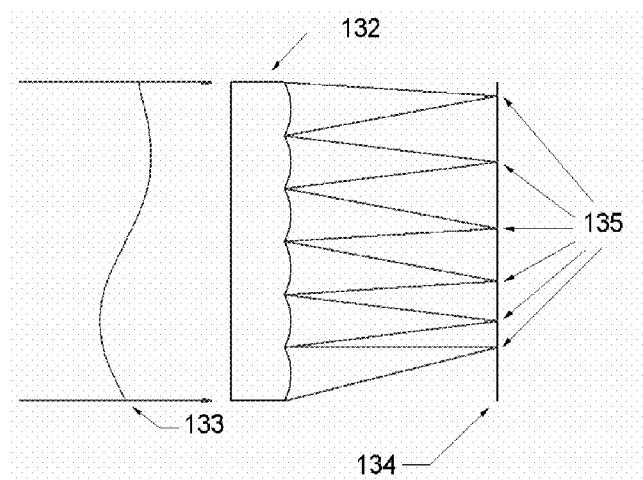
FIG. 1B is a diagram of an exemplary wavefront sensor that may be used in the system of FIG. 1A.

Beneficially, in one embodiment, the wavefront sensor 130 is a Shack-Hartmann wavefront sensor, an example of which is shown in FIG. 1B. The Shack-Hartmann wavefront sensor of FIG. 1B includes a lenslet array 132 that dissects the incoming wavefront 133 and projects focal spots 135 onto a sensor (e.g., a detector array) 134. Although the Shack-Hartmann wavefront sensor provides some benefits in certain contexts, as explained in detail in various places below, the system 100 of FIG. 1A is not limited to the use of a Shack-Hartmann wavefront sensor and, instead, other sensors, such as a shearing interferometer, may be used, without departing from the broad scope of various aspects of the invention.

It should be noted that the term dynamic-range-limiting aperture (RLA) refers to an aperture for limiting the wavefront dynamic range of light that is incident upon the wavefront sensor. In most cases this may be an aperture with a prescribed shape that is located relative to an imaging lens in the optical system so that it limits the range of angles that may pass through the system. The RLA size and shape is adjusted so as not to exceed the range that the wavefront sensor can detect without ambiguity. Beneficially, the RLA has a rectangular shape (e.g., a square shape) to match the shape of the pixel group assigned to a lenslet, for example. However, the RLA may have a round shape, hexagonal or other shape as needed by the particular sensor. The RLA may be designed to pass light to exceed certain strict limits of the dynamic range to provide for an optimum combination of optical and algorithmic analysis. Such an approach may allow the actual dynamic range of the system to be increased.

FIG. 1A also shows an exemplary device under test (DUT) 170. The DUT has a non-planar, three-dimensional surface 175. In the example shown in FIG. 1A, the surface 175 is generally spherical in nature, and more particularly, may be a mold for manufacturing a contact lens, intraocular lens, aspheric lens or other optical element. It may further be a telescope mirror, aspheric imaging lens, lens element, or photolithography lens, or any other surface that has specular reflectivity. The system 100 is able to measure and map the surface 175 to characterize any surface irregularities and aspherical aberrations as described in more detail below.

Figure 2A:
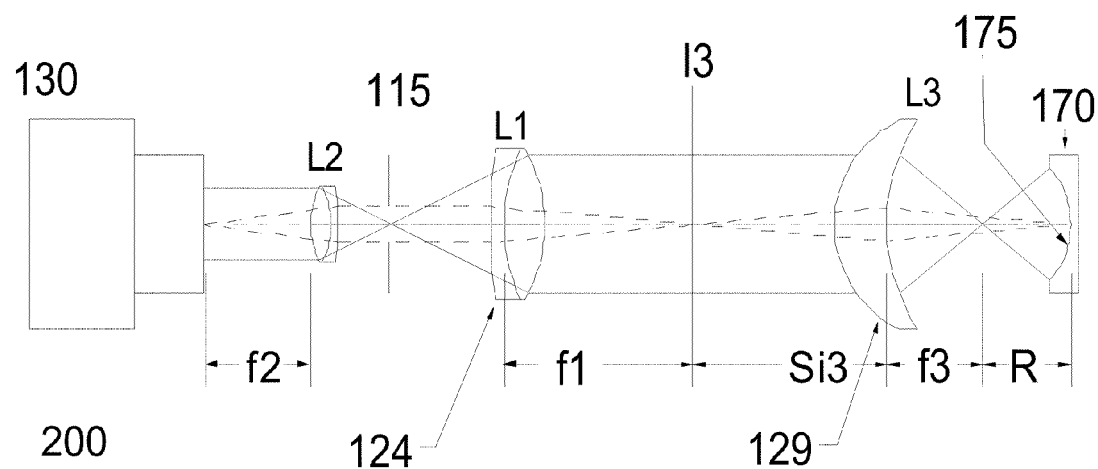
FIGS. 2A-B show exemplary positional relationships between certain elements of the system of FIG. 1.
Figure 2B:
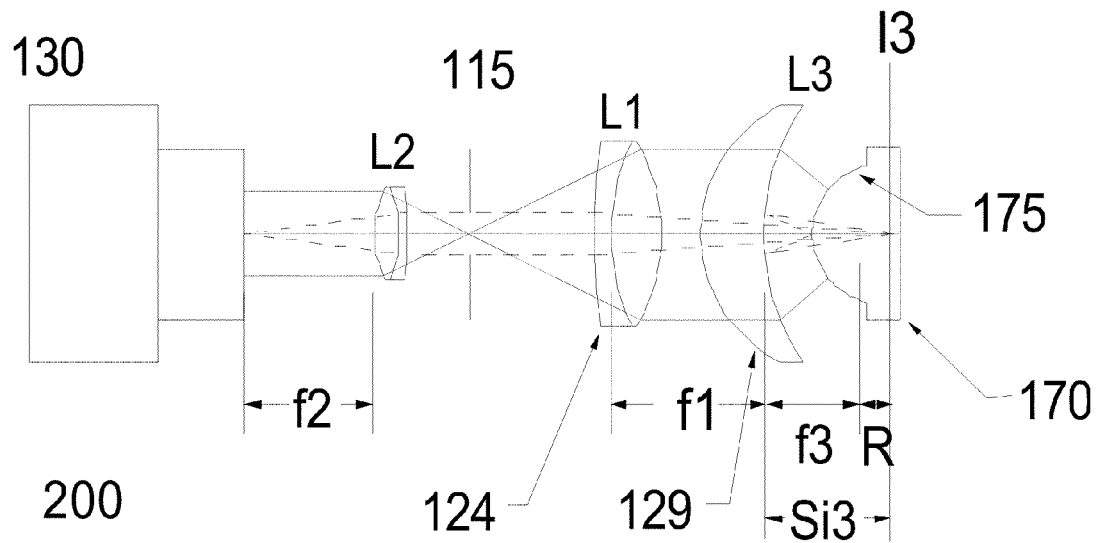

FIGS. 2A-B help to explain the positional relationship between the telescope lens 124, the reformatting lens 129, and the DUT 170. The projection system 110 is not shown in FIGS. 2A-B for simplicity of illustration. As illustrated in FIG. 2A, for a concave DUT 170 light passing through the telescope lens 124 is imaged at an image plane position designated "I3." The reformatting lens 129 is located a distance Si3 from the position of the image plane I3. The reformatting lens 129 has a focal length "f3" and the surface 175 of the DUT 170 has a base radius of curvature that is indicated as "R" in FIG. 2A.

In this case, given the base radius of curvature R of the surface 175 of the DUT 170 and the focal length f3 of the reformatting lens 129, one can calculate the position Si3 to be:

$$\frac{1}{Si_3} = \frac{1}{f_3} - \frac{1}{(f_3 + R)} \tag{1}$$

FIG. 2B illustrates the case of a convex DUT 170. In this case the location of the image plane I3 is adjusted so that it matches the virtual image of the DUT 170 created by the reformatting lens 129 (L3). In this case the radius R is negative and the resulting image distance Si3 is therefore also negative. By adjusting the position of both reformatting lens 129 and the DUT 170 (i.e., by changing the position of the movable stage 107), the image or virtual image plane of reformatting lens 129 can still be matched to the object plane (labeled I3) of telescope lens 124 (L1) and hence imaging can be maintained throughout the system from the surface of the DUT 170 onto the wavefront sensor 130.

Using either the arrangement of FIG. 2A or FIG. 2B, highly curved DUTs 170, either convex or concave in nature, can be tested. The choice of reformatting lens 129 is determined by the radius of curvature of the DUT 170s to be measured. The field of view is determined by the magnification M2=−f1/f2 (where f1 is the focal length of lens L1 and f2 is the focal length of lens L2), and by the size of the wavefront sensor input aperture.

Since the device under test may have a wide range of local radii of curvature, it is possible that the light that is collected by reformatting lens 129, and transmitted through telescope lens 124 (L1 in FIGS. 2A-B) to the RLA 115 arrives at a significant angle. If this light were to be allowed to propagate through the rest of the system, it would result in a wavefront that would exceed the dynamic range of the wavefront sensor 130. The dynamic-range-limiting aperture (RLA) 115 clips any such rays, thereby insuring that the wavefront sensor 130 never receives light that exceeds its measurement capabilities. However, this means that there may be portions (even significant portions) of the DUT 170 that cannot be measured, and hence no light would be returned through the system to the wavefront sensor 130 for this condition.

Figure 3:
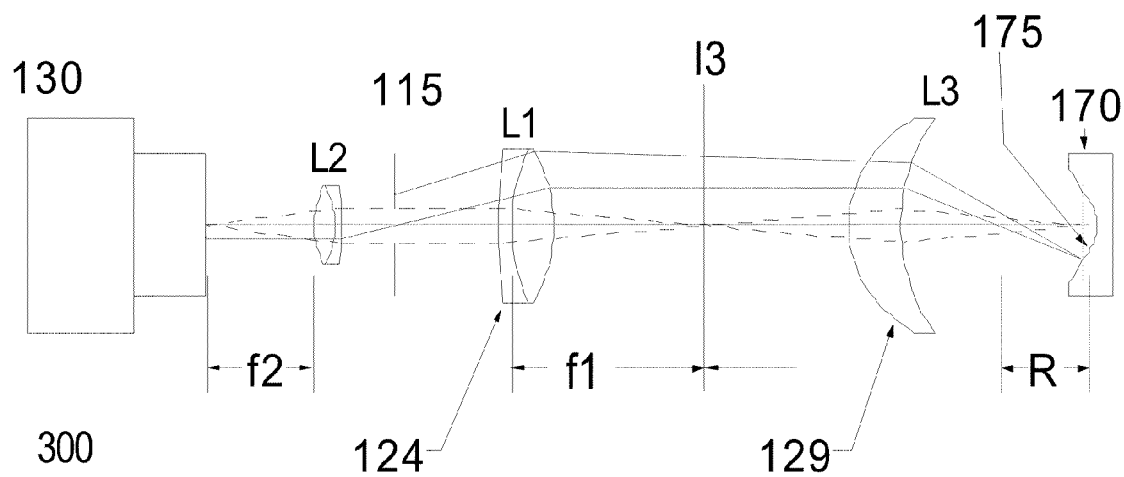
FIG. 3 shows an exemplary condition where a device under test has a portion of its surface that produces reflections that would typically be out of range for a wavefront sensor.

FIG. 3 shows a DUT 170 that has a portion of the surface that would exceed the angular dynamic range of the wavefront sensor 130. A ray that is incident on this portion of the wavefront sensor 130 is shown. This ray originates from the injection system, is relayed onto the DUT 170, and the collected light is then collected by reformatting lens 129 and directed back toward the wavefront sensor 130. However, because this ray has a greater angle than the wavefront sensor 130 is capable of detecting, it arrives at the RLA 115 off axis. The size of the RLA 115 is chosen so that only in-range rays may be admitted. Thus the ray shown in FIG. 3 is clipped, and does not pass through the RLA 115 to thereby cause inaccurate measurements. The particular ray shown in FIG. 3 is from a region that is more highly curved than the rest of the DUT 170 (from the inner portion, in this example). However, rays from the outer region (in this example) are well matched to the optical system, and thus would transit the entire system and would therefore be detected by the wavefront sensor 130. All such rays corresponding to the outer region (in this example) would pass through the RLA 115 and thus be detected. Thus, in this configuration, the wavefront sensor 130 would receive light from a ring corresponding to the outer region of the DUT 170. No light would be collected from the middle (except for one point exactly on axis). All of the light collected in this ring could be used to make an accurate measurement of the DUT 170 in this region.

This basic concept of using a dynamic-range-limiting aperture was used to good effect in the '917 patent to assure that all rays that were collected by (in this case) the ophthalmic wavefront sensor system for measuring the eye were always in range. The instrument described in the '917 patent, however, was designed to acquire all of the information in a single frame, after adjustment of movable parts of the optical system to optimize the dynamic range. The RLA was used, in that case, primarily to ensure that only "in-range" light was incident on the sensor during the adjustment procedure, and thus facilitate rapid and accurate adjustment.

Now, this concept is extended further. By adjusting the position of the moving stage 105 in FIG. 1A, the spacing of telescope lenses 122 and 124 may be changed. This changes the focus condition for light transmitted through the optics and also received by the wavefront sensor 130. Adjustment of the distance between the principle planes of these lenses to a distance equal to the sum of their effective focal lengths results in a planar wavefront transmitted through telescope lenses 122 and 124. Reformatting lens 129 reformats this to a spherical wavefront that converges (in the case of convex DUTs 170) or diverges (for concave DUTs 170) to match the appropriate radius of curvature of the DUT 170. If the distance between the telescope lenses 122 and 124 is set to a different distance (by adjusting movable stage 105), then the transmitted wavefront is no longer planar, but may be converging or diverging. Reformatting lens 129 then reformats this to either a slightly longer, or a slightly shorter (depending upon the type of DUT 170) radius of curvature wavefront that would be incident upon the DUT 170. If this incident wavefront approximately matches the radius of curvature of the DUT 170, then the incident light will be reflected back such that it can be collected by the optical system, pass through the RLA 115, and be measured by the wavefront sensor 130. If it does not match the radius of curvature of the DUT 170 well, then it will be clipped by the RLA 115. Thus to measure the entire surface of the DUT 170, the instrument must have sufficient range of travel of the moving stage 105 to allow adjustment of the relative positions of telescope lenses 122 (L2) and 124 (L1) over an appropriate range.

Accordingly, the telescope lenses 122 and 124, and where necessary the reformatting lens 129, function as a correction, or pre-correction, system for that compensates the light beam for one or more aberrations in the DUT 170. Alternatively, instead of one or more lenses being mounted on a movable stage, a variable focal length lens may be employed. The focal length of such a lens may be controlled by the processor 152.

At each relative position of telescope lenses 122 and 124, there is a particular radius of curvature that can be measured on the DUT 170. Since the DUT 170 may have a wide variation in radii, at any one time it will not be possible to measure the entire DUT 170 (unlike the eye, where the '917 patent instrument was designed to have sufficient dynamic range (after adjustment) to measure the entire eye in a single measurement). But a series of measurements, each corresponding to a different position of lens 122 relative to lens 124, would result in a measurement of different regions of the DUT 170, each corresponding to a different radius of curvature. Since the separation between telescope lenses 122 and 124, and the focal lengths of these lenses, is known from the instrument design, the relative defocus can be determined through the position of the stage 105. Thus the series of measurements, each at a known incident radius of curvature can be obtained.

Given such a sequence of measurements, it is also possible to take advantage of the known incident radius of curvature for each individual measurement, and thus produce the measurement over the entire DUT 170. The sequence of measurements can be pieced together, or "stitched" together, to form a single map of the three-dimensional surface of the device under test. This is different from what is disclosed in Neal et al. U.S. Pat. No. 6,184,974, "Apparatus and Method for Evaluating a Target Larger Than a Measuring Aperture . . . ." in that, instead of stitching together small portions of the measurement of the DUT by multiple sub-aperture measurements (area stitching), the stitching occurs through stitching together portions of the measurement that would otherwise be out of range for the wavefront sensor.

The geometry proposed in FIGS. 1-3 for measuring highly curved optical elements is not the only geometry where this technique is useful. Modern contact lenses, intraocular lenses, and highly aspheric optical elements also pose difficulties in measurement due to rapidly changing curvature over part of the optical element. These elements may be better measured in transmission, as shown in FIGS. 8 and 9.

Figure 8:
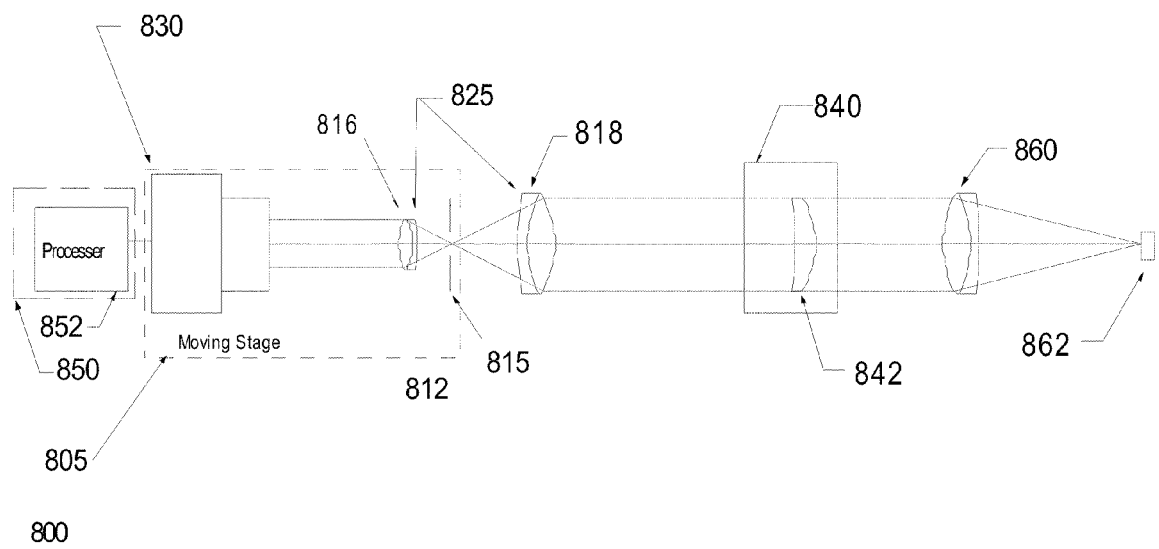
FIG. 8 shows an arrangement for measuring transmissive optical elements using the methods of this invention.
Figure 9:
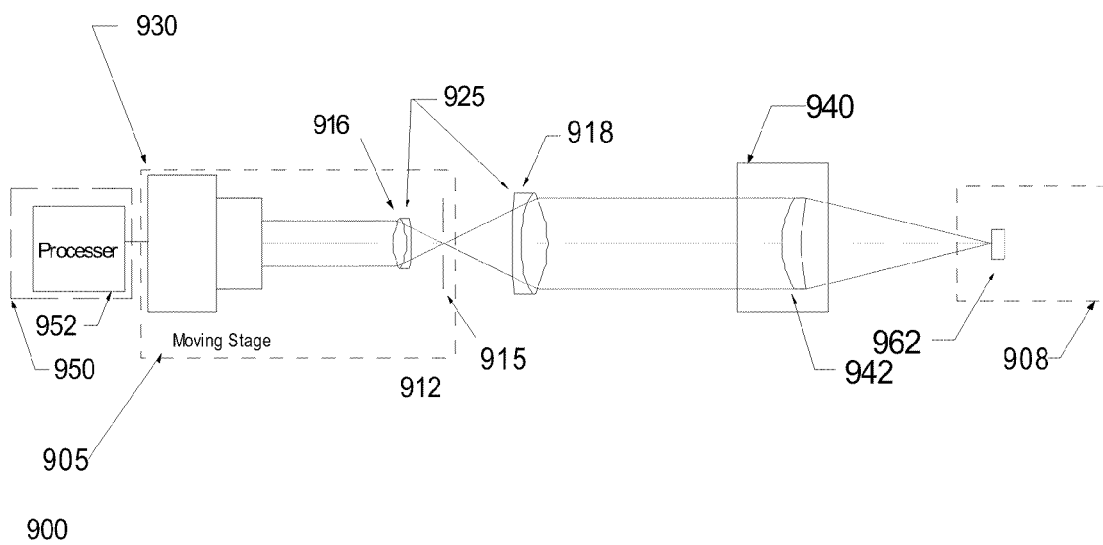
FIG. 9 shows an arrangement for measuring a transmissive optical element that has significant optical power.

FIG. 8 illustrates an optical element as the device under test (DUT), such as a contact lens 842, which has portions that would normally exceed the dynamic range of the sensor 830. FIG. 8 shows measurement of a contact lens or other transmissive optical element that has low net power. A collimated beam is passed through the DUT 842 and analyzed by the sensor. Either the source 862 or the moving stage 805 can be moved to acquire data over the various zones as needed. In this case the lens has little net optical power, or at least falls within the range of optical power that may be corrected by moving the movable stage 805. Light from a source 862 is collimated using lens 860 and transmitted through the DUT 842 which may be held in a test cell or mount 840. This light is collected by optical system 825, which contains parts mounted on a moving stage 805. The wavefront sensor 830, dynamic-range-limiting aperture 815 and one of the imaging lenses 816 are mounted on this movable stage 805. Advantageously, the wavefront sensor 830 is positioned so that the distance from the wavefront sensor 830 to the lens 816 is equal to the focal length of lens 816. Meanwhile, the DUT 842 is positioned at a distance from lens 818 equal to the focal length of lens 818. During the measurement process the dynamic-range-limiting aperture 815 clips any light that would otherwise exceed the dynamic range of the wavefront sensor 830. The moving stage 805 position is varied and data is acquired and saved by the processor 852. This data may be stitched together using the methods set out below, to reconstruct a measurement of the entire DUT 842. Instead of moving the sensor 830, lens 816, and RLA 815, it may be advantageous to move the source 862 relative to the DUT 842 instead. This will serve a similar purpose.

In a similar manner, an optical element that has significant optical power can be measured by omitting the collimating lens 860, and using the DUT itself to partially collimate the light from the source. Such a case is shown in FIG. 9. FIG. 9 shows measurement of an intraocular lens (IOL) or other transmissive optical element that has significant focusing power. A collimated beam is passed through the DUT 942 and analyzed by the sensor. Either the source 962 or the moving stage 905 can be moved to acquire data over the various zones as needed. In this case the DUT 942 collimates the light from the source 962. This light is then collected with imaging system 925 onto sensor 930. In this case there are two different ways for the multiple measurements to be stitched together can be obtained. Either the position of the movable stage 905 may be varied, as described previously, or the position of the source 962 may be varied using movable stage 908. Since the focal power (effective focal length) of the DUT 942 may not be known, it may be necessary to include an option for moving the movable stage 908 in any case. Then the movable stage 905 may be omitted since it serves no unique function.

Now, embodiments of a process for stitching together individual measurements will be described. FIGS. 4A-D depicts a sequence of measurements for a particular type of DUT 170 using the system of FIG. 1A. In this case the DUT 170 is a mold for a bifocal contact lens. The mold has regions with widely different radii of curvature with extremely sharp transitions between regions. As can be seen in FIG. 4E, there are six basic annular zones, with zones 1, 3 and 5 having one radius of curvature, zones 2 and 4 a different radius of curvature, and zone 6 having yet a different radius. It is important to be able to measure the different radii of curvature accurately, e.g. an absolute accuracy of better than 0.005 mm for a DUT 170 with a 7 mm base curve. For the data represented in FIGS. 4A-D, the radii of curvature of the different regions is sufficiently different that it would not be possible to design a wavefront sensor 130 (e.g. a Shack-Hartmann wavefront sensor) with sufficient dynamic range that could also achieve the required accuracy.

The following techniques are applied to measure the DUT 170.

First, the DUT 170 is positioned in the metrology instrument 100 at the appropriate image plane. This plane may be determined by either optical or mechanical means.

To determine the appropriate position optically, the DUT 170 is initially positioned with the surface approximately one focal length from reformatting lens 129. The telescope lenses 122 and 124 are separated to be spaced apart by the sum of their focal lengths, so that they will provide a collimated (flat) transmitted wavefront when the DUT 170 is positioned exactly at the image plane. Then, the position of the DUT 170 is adjusted (by means of movable stage 109) until the wavefront as measured by the wavefront sensor 130 is flat, which means that the DUT 170 is located at the so-called "cat's eye" position. This is a well-known condition optically where the light is focused on the surface of the DUT 170 at a single point. It is not sensitive to alignment or position of the DUT 170 other than the relative distance from reformatting lens 129. This position is recorded using a micrometer, encoder or other position gauge on the relative position between the DUT 170 and reformatting lens 129.

Next, the DUT 170 is moved (again, by movable stage 109) by approximately the radius of curvature of the central region of the DUT 170. The position of the DUT 170 is then finely adjusted to once again provide a flat wavefront over at least some portion of the surface (usually the central region) as determined by the wavefront sensor 130. This is often called the "confocal position." The difference between the "cat's eye" position, and the confocal position is the base radius of curvature of the DUT 170 (Rb).

If the DUT 170 is arranged so that it may be registered accurately (at least to within the desired measurement accuracy), then the preceding steps (moving to the "cat's eye" position and then the confocal position) may not be necessary once the instrument is calibrated. The calibration and positioning accuracy are sufficient to achieve accurate measurement and the base radius may be determined only from the stage position readout at the collimation position.

Next the spacing between the imaging lenses 125 is varied systematically so as to acquire a sequence of measurements. In the example that produced the chart of FIG. 4E, 40 separate measurements were acquired. However, hundreds or even thousands of measurements may be used to increase the signal-to-noise ratio. Each measurement is taken with a different spacing between telescope lenses 122 and 124 and thus with a different reference defocus. The spacing is accurately recorded using a position detection system (e.g. an encoder) on the mechanical stage that is used for positioning. For a wavefront sensor 130 that measures wavefront slope (such as Shack-Hartmann, Moire deflectometry, shearing interferometer), the position of the stage 105 can be used to modify the acquired wavefront data to include the appropriate defocus.

The surface shape, S(x, y), is determined partly by the defocus introduced through the variable separation of telescope lenses 122 and 124 and reformatting lens 129 and hence the stage position f(x,y), and partly from the measured wavefront of the sensor w(x,y):

$$S(x,y)=f(x,y)+w(x,y) \quad (2)$$

The resulting slope at each point across the aperture is:

$$\theta^x(x, y) = \frac{\partial f(x, y)}{\partial x} + \theta_m^x(x, y) \quad (3)$$

$$\theta^y(x, y) = \frac{\partial f(x, y)}{\partial y} + \theta_m^y(x, y)$$

Where the defocus wavefront is given by f(x,y):

$$f(x, y) = \frac{(x^2 + y^2)}{2R} \quad (4)$$

and so $$\frac{\partial f}{\partial x} = \frac{x}{R} \quad (5)$$

and $$\frac{\partial f}{\partial y} = \frac{y}{R} \quad (6)$$

Each of these measurements may not have a complete characterization over the surface, but the collection together should span the entire space. If the measurements are from a slope type wavefront sensor (as in the example above) then the slope distributions must be reconstructed to retrieve the wavefront distribution.

Figure 4A:
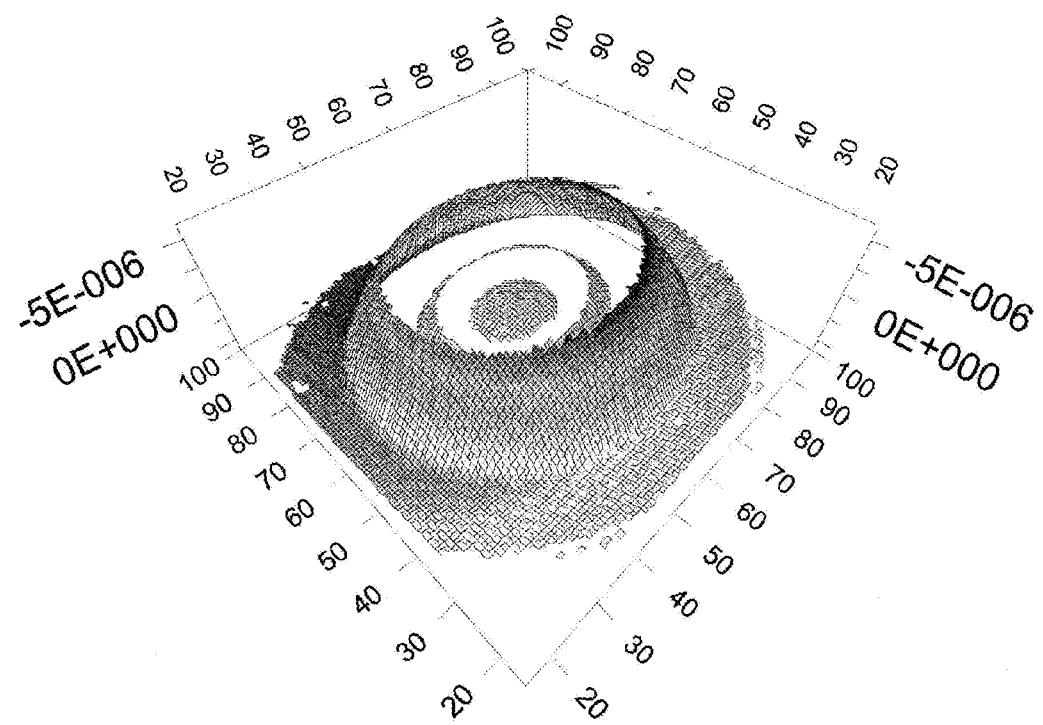
FIGS. 4A-E illustrate measurements of portions of a surface of a device under test and then stitching together the partial measurements to produce a complete measurement of the surface.
Figure 4B:
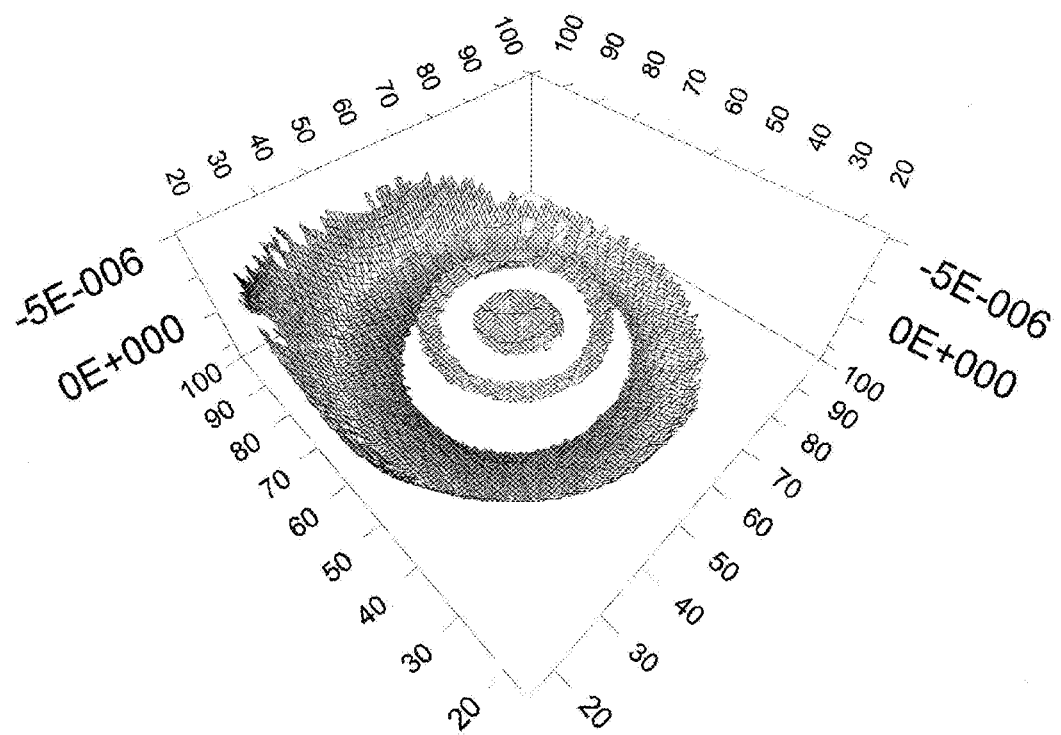
Figure 4C:
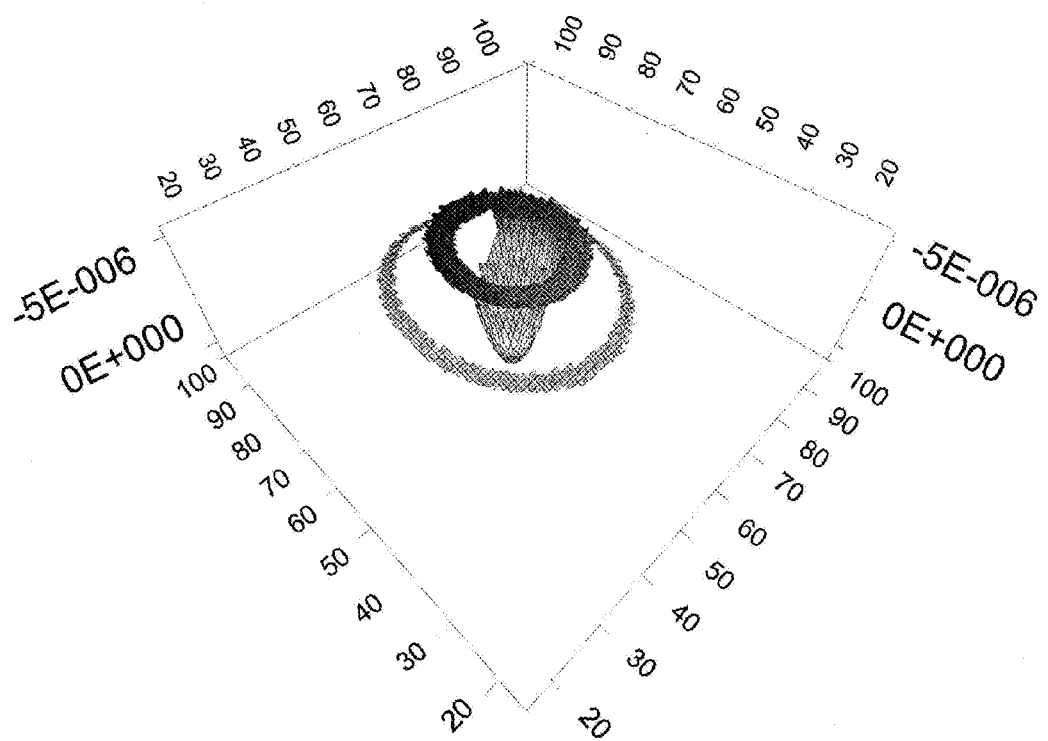
Figure 4D:
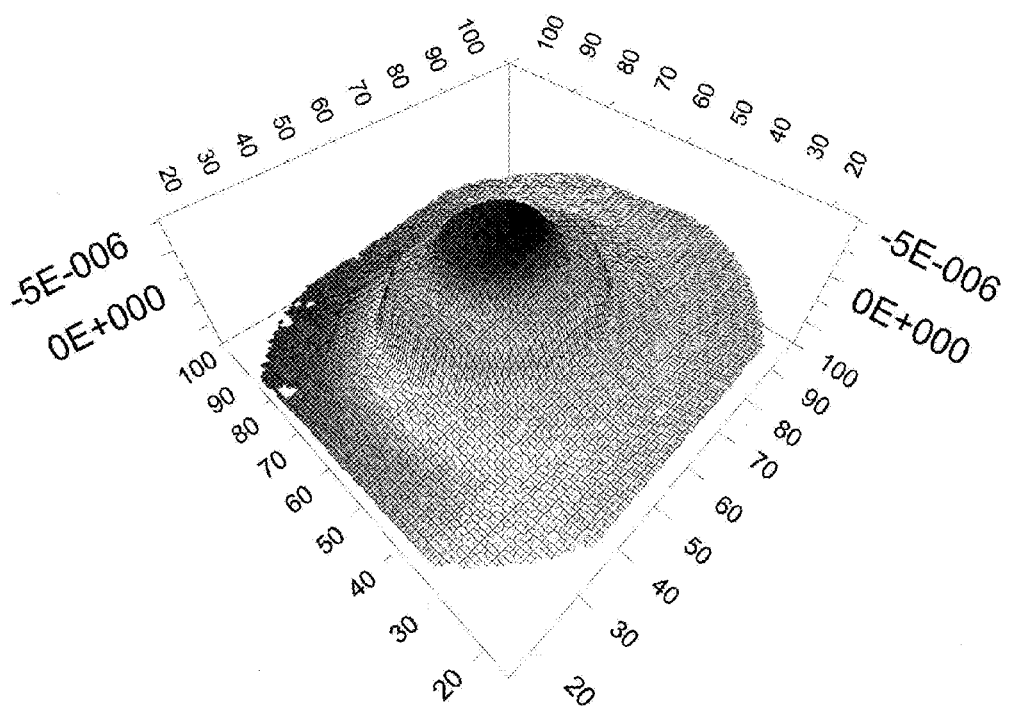
Figure 4E:
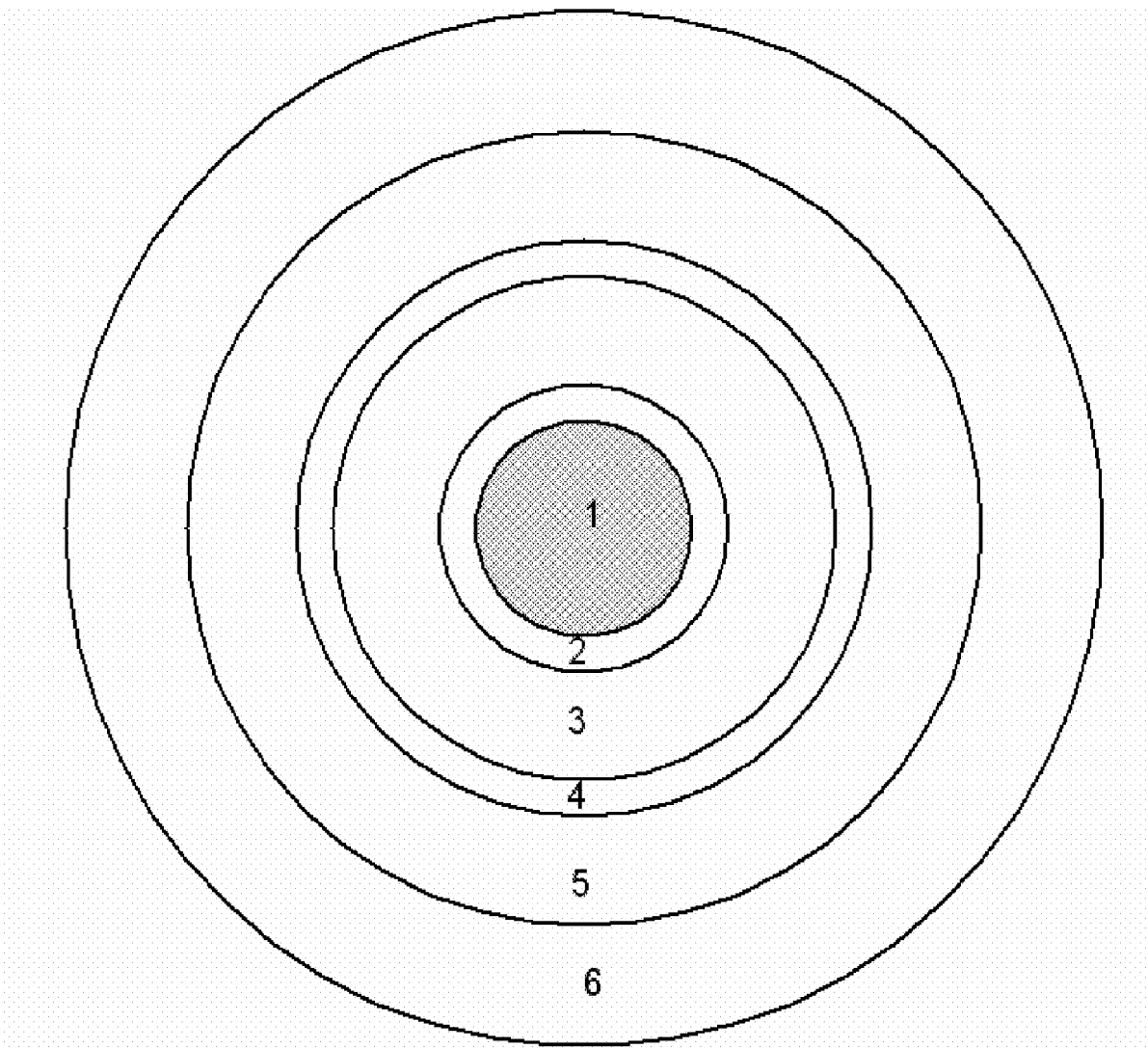

FIGS. 4A-D illustrate a sequence of these measurements. FIGS. 4A, B, and C show three different individual measurements. Note that there is a significant portion of each image where no data was acquired. However, these regions overlap in such a way that the entire image can be retrieved.

The images are stitched together using Eqns. 2-6 to include the appropriate defocus term. The stitching can be done through a number of methods, which may include spot tracking, averaging, or other means.

As an example, averaging can be applied to defocus corrected measurements. In the averaging method for stitching, one takes advantage of the fact that Eqns. 2-6 apply the correct defocus term to each of the wavefront sensor measurements so that each measurement represents a complete, accurate measurement of the surface, even if only a portion of the surface has available data. Thus for each location (x,y) on the surface, the surface height at a given position is determined independently by each measurement. Thus, an accurate measure of the surface height can be determined simply by averaging each surface height from each valid measurement. However, for strongly varying DUT 170s, there are regions where no valid data is available (due to the RLA 115). These points are not included in the average, so that for each location (x,y), a different number of points may be included in the average, depending upon the number of valid overlapping measurements. As the defocus is varied, this has the effect of "filling in" the missing portions of the data so that the whole surface is included.

For a slope type wavefront sensor, the wavefront is determined by integration from wavefront gradient measurements. This integration involves an arbitrary constant of integration that cannot be specified. So, for unconnected regions it is impossible to determine the actual surface position, and only relative surface height within a connected region can be obtained. However, the defocus correction of Eqns. 5 and 6 applies to the slope. Therefore if, instead of averaging the wavefronts, the wavefront slopes are averaged, then it is possible to perform the wavefront reconstruction after the stitching process has completed. This will lead to a large connected region and hence improved performance of the algorithms. Mathematically, for an AOI "k" and measurement "m," the slope at a point $\theta_k^x(x,y)$ can be constructed from a series of measurements $\theta_{k,m}^x(x,y)$ given a validity function $V_{k,m}(x,y)$, similarly for $\theta_{k,m}^y(x,y)$.

$$\theta_k^x(x, y) = \frac{\sum_m V_{k,m}(x, y)\theta_{k,m}^x(x, y)}{\sum_m V_{k,m}} \quad (7)$$

The validity function describes where data is valid and may easily be obtained by evaluating the irradiance of the light at each measurement point. Among other methods, the validity function can be constructed from irradiance measurements $I_{k,m}(x,y)$.

$$V_{k,m}(x, y) = \begin{cases} 1 & I_{k,m}(x, y) \geq t \\ 0 & I_{k,m}(x, y) < t \end{cases} \quad (8)$$

where t is a predetermined "irradiance threshold."

In the embodiment where the wavefront sensor 130 consists of a Shack-Hartmann wavefront sensor that comprises a lenslet array disposed in front of a detector array, there are a number additional ways to construct the validity function in an optimal fashion. The total light that is collected by each lens in the lenslet array is readily determined by adding up all the pixel values associated with that lenslet. This can be used as an estimate of the irradiance for this portion of the measurement $I_k(x,y)$. Eqn. 8 can be used to construct the validity function through the use of the RLA 115 to clip any light that would otherwise be out of range. This validity information may be obtained in other ways from different measurement instruments. However, it is usually easy to determine a region where valid data exists by analyzing the images obtained by the respective sensor.

However, additional information may also be obtained from the Shack-Hartmann image. Each focal spot covers a number of pixels. This is necessary in order to get optimum accuracy from this type of sensor. Using a Shack-Hartmann wavefront sensor and sensing method, an area-of-interest (AOI) comprising N pixels is assigned to each lenslet. Neal et al., "Shack-Hartmann wavefront sensor precision and accuracy," SPIE 4779, (2002), showed that that optimal signal to noise was obtained when about 50 pixels were covered by each focal spot in the measurement process. This is about a 7×7 group of pixels, in general. The position of the focal spot is determined through a $1^{st}$ moment algorithm (sometimes called a centroid algorithm):

$$\bar{x} = \frac{\sum_i s_i x_i}{\sum_i s_i}, \quad (9)$$

where the summation is performed over all N pixels in each area-of-interest (AOI) assigned to each lenslet (similarly for the y position). With about N=50 illuminated pixels, the focal spot position can be determined to about $\frac{1}{50}^{th}$ of a pixel, which is the boundary where other systematic effects start to affect the accuracy. With this distribution of pixels, however, it is also possible to estimate the size of the focal spot. This can be done through the $2^{nd}$ moment algorithm:

$$\sigma_x^2 = \frac{\sum_i s_i(x_i - \bar{x})^2}{\sum_i s_i} \quad (10)$$

FIGS. 5A-D illustrate several exemplary conditions of illuminated pixels in a single AOI.

Figure 5A:
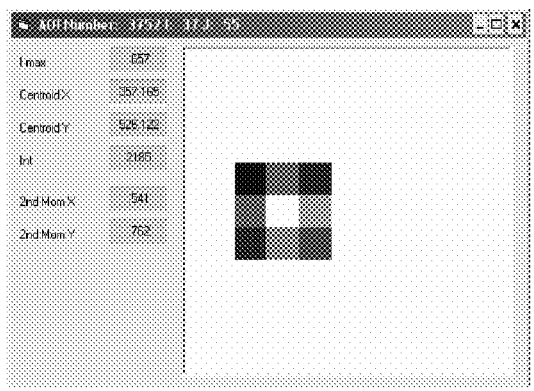
FIGS. 5A-D illustrate the effect of out-of-range conditions on the pixels values in a group of pixels assigned to a focal spot (Area of Interest).

FIG. 5A shows a typical AOI with normal in-range light. The focal spot size comes into play because it provides information about the changes in the lenslet focal spot. The lenslet focal spot can be modified by various effects in the optical system which it would be advantageous to detect.

Figure 5B:
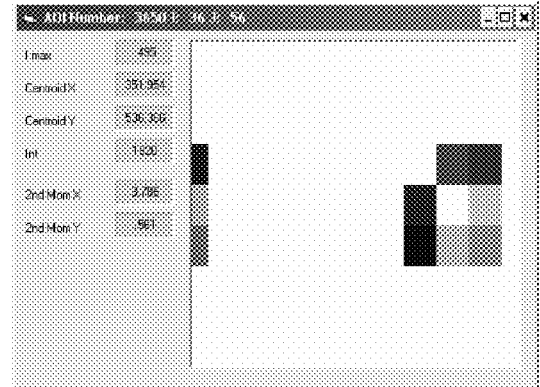

FIG. 5B illustrates a slightly out-of range condition. Some light from an adjacent lenslet is "leaking" into the edge of the pixels under the lenslet of interest. This biases the data and reduces the accuracy. In this condition the $2^{nd}$ moment spot size changes dramatically (by factors of about 4-10 or more) since the positional weighting ($x^2$) gives a strong weight to a small amount of signal on either edge of the area of interest. A very coarse threshold (i.e. 2-3 times the average σ (averaged over all k)) is sufficient to detect this condition and add these AOIs to the validity function, i.e.

$$V_k = V_k^{it} + \begin{cases} 1 & |\sigma_k - \sigma_k^{REF}| < t_\sigma \\ 0 & |\sigma_k - \sigma_k^{REF}| \geq t_\sigma \end{cases} \quad (11)$$

where the reference second moments, $\Phi_k^{REF}$, are recorded in a calibration step where the collected wavefront was ensured to be completely in range. Usually this is the result of calibration with a perfect sphere or other ideal optical element.

Figure 5C:
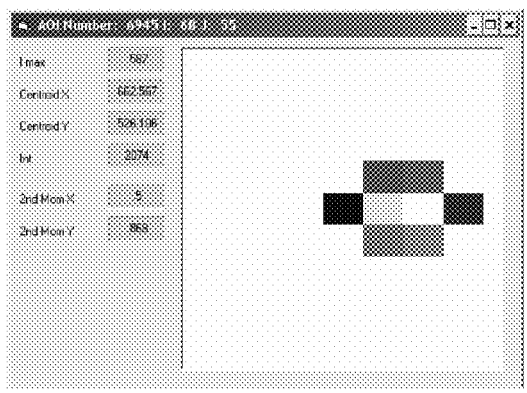

FIG. 5C illustrates a diffracted focal spot. Since the operation of the system as disclosed above necessitates scanning the defocus position, it is evident that the focal spots will move though the AOIs, entering from one edge and leaving from the other. This will perforce cause the focal spot to transit the RLA 115. When the focal spot is partly on the edge of the RLA 115, this clipping will cause diffraction. This diffraction will cause the focal spot to grow until it is completely clipped. Using Equations 10 and 11, it is possible to identify these conditions and construct the appropriate validity function.

Figure 5D:
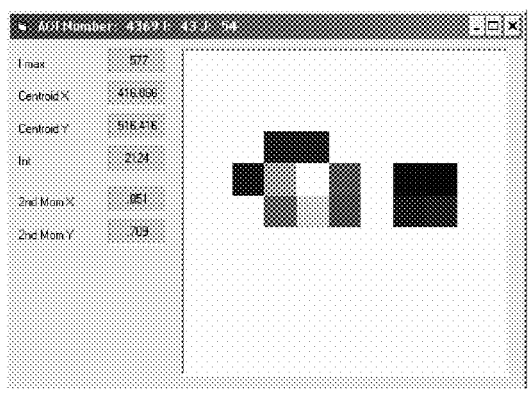

FIG. 5D illustrates a case where the DUT 170 has a complex geometry. For the complex DUT 170 described above, there are regions with a sharp transition in curvature. This means that there are cusps or sharp changes in slope on the surface of the DUT 170. For those lenslets that cover such a sharp transition, the light will be reflected in two different directions simultaneously. This will result in greatly distorted focal spots. These distorted focal spots will be bigger than a non-distorted focal spot, and hence can be readily detected with Eqns. 10 and 11.

Focal Spot Tracking

For a Shack-Hartmann wavefront sensor, the assignment of pixels to lenslets is required to assure that the wavefront can be determined without ambiguity. Thus a unique mapping from a particular group of pixels to a particular lenslet must be maintained. Several different techniques for determining this mapping have been used (e.g., T. Bruno et al. "Applying Hartmann wavefront sensing technology to precision optical testing of the Hubble Space Telescope correctors," SPIE 1920, pp. 328-336 (1993)). In practice, the most common is to predetermine this mapping from an initially flat wavefront that is incident upon the sensor. In this case the dynamic range of the sensor is given by the location where the edge of the focal spot is located at a position that is on the boundary of the pixels assigned to that lenslet. For a sensor designed without intervening optics between the lenslet array and the detector array (e.g., following the methods of U.S. Pat. No. 6,130,419 "Fixed mount wavefront sensor"), the size of the group of pixels is the same size as the lenslet array. Thus the angular dynamic range is given by $$\theta_{max} = \frac{d/2 - f\lambda/d}{f} \quad (12)$$

In practice, the use of thresholds means that this maximum angular dynamic range estimate is usually slightly conservative, that is, the threshold focal spot is actually slightly smaller than $f\lambda/d$ in radius, so the second term in Eqn. 12 is slightly less, resulting in a slightly larger dynamic range. For a 12% threshold, the threshold spot size is approximately $3\lambda/4d$.

However, it should be noted that the group of pixels assigned to the focal spot is purely an arbitrary convention. Thus, using a priori, internal, or other information to increase the dynamic range of the sensor can adjust this assignment.

Further, the group of pixels that are assigned to a particular lenslet can be determined through an algorithm that assigns the pixel group to the lenslet array, and then determines the centroid (or spot location) from the assigned group of pixels. To this end, the following algorithms which may be used to assign the pixel groups, or Areas of Interest (AOIs), to the lenslets.

One Frame Tracking

If the focal spots are arranged so that there is sufficient local tilt in the wavefront (and either no RLA is employed, or the size of the RLA is large) such that two partial focal spots are located on the edges of the pixel AOI, then there will be a significant error in estimating the spot location using Eqn. 9. However, if the local tilt is less than $d/(2f)$, that is, if the centroid as determined by Eqn. 9 is in the correct half of the AOI, then an additional calculation step will result in increased dynamic range. This calculation consists of moving the pixel group (AOI) to be centered on the centroid position determined by the first step, and then calculating again the centroid using Eqn. 9, but with the new group of pixels. Unless the focal spots on each edge are precisely balanced, this will result in almost a 50% increase in the dynamic range. To assure that the focal spots are in the right arrangement initially, the RLA size can be adjusted to clip light that has an incident angle exceeding $d/(2f)$. As an example consider a lenslet with 2 mm focal length, and 0.072 mm diameter. In this case the nominal dynamic range (for 635 nm light) is 9.2 mr, whereas one frame tracking would allow 18 mr of angular dynamic range, almost a factor of 2 improvement.

Iterative Wavefront Fitting

For some types of optical system the wavefront may have some region where it is bounded and in range in some locations, but exceeds the nominal dynamic range of the system according to the definition given in Eqn. 12. If the wavefront is smoothly varying, then it is possible to extrapolate the location of AOIs outside the region of in-range data. It is typical that the in-range portion of the wavefront is in the center of the sensor area, although it may be in a different location, as long as this location can be identified using a priori, $2^{nd}$ moment, or other methods.

Figure 6:
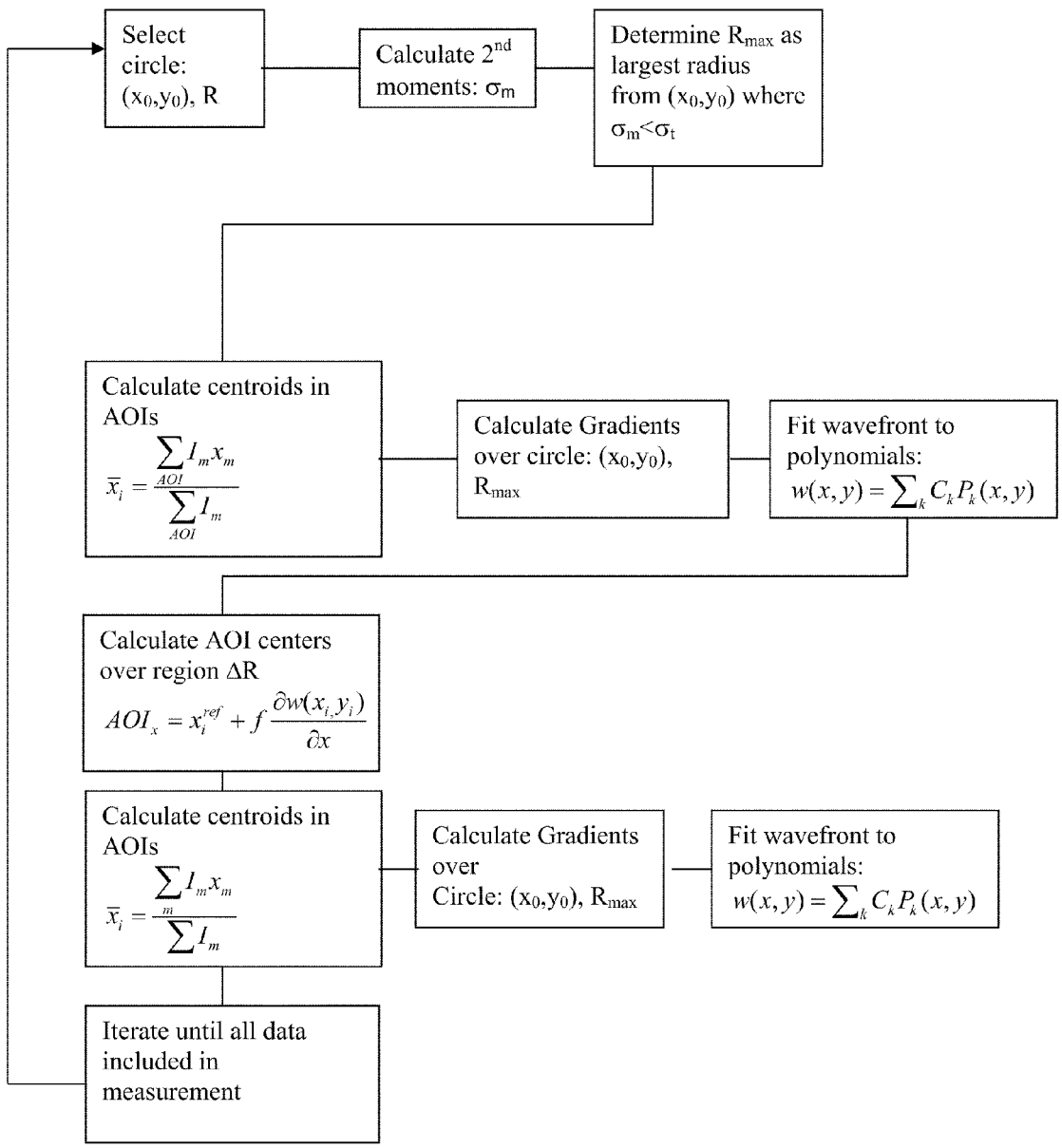
FIG. 6 is a block diagram description of an algorithm to expand the dynamic range by use of iterative wavefront fitting method for tracking Areas of Interest.

This method is outlined in FIG. 6. Starting with the region of in-range data, a wavefront surface is fit to the data over only the region that is confirmed to be in-range. This can be checked using the $2^{nd}$ moment algorithm to verify that only a single focal spot is contained in each AOI in a particular region. The wavefront fitting is performed using Zernike polynomials, Taylor monomials, or other polynomial or continuous functions as appropriate to the data under test. A priori information can be used to limit the region of connected data if it is available. The fitted wavefront can then be used to project the location of the center of an extrapolated set of AOIs by computing the slope at center of each lenslet, and projecting the location of the centroid associated with the lenslet by assumption that the wavefront is continuous and varies smoothly over at least a small region. The AOI positions, that is, the particular pixels assigned to a lenslet, are changed to reflect this expected focal spot location, and then Eqn. 9 is used to compute a new centroid. The $2^{nd}$ moment algorithm (Eqn. 10) can be compared to a threshold to determine if the algorithm is successful in calculating in-range focal spots. The resulting centroid pattern is then used to compute a new set of wavefront slopes, which are then used in the computation of a new wavefront polynomial fit. The process can be repeated until either all of the data has been analyzed, or regions are identified where the data is so rapidly varying that no successful wavefront can be computed.

Calibration Steps

The system 100 of FIG. 1A can be calibrated internally through the use of a few known parameters. Since the optics are mounted on movable stages with precise motion control, the position of various groups of optics may be varied systematically while recording the outputs of the wavefront sensor. The relative position of various groups of optics can be precisely determined through the use of common linear travel stages with stepper (or servo) motor drives and position encoders. In practice it is easy to obtain accurate positioning on the order of 1 micrometer. Variation of the optics position, in various groupings, allows the determination of most of the optical parameters of the system.

Parameters that need to be determined include, but may not be limited to, the focal lengths of the various lenses $f_1$, $f_2$, and $f_3$, the offset positions of the various stages (that is the absolute position of the center of travel of each movable stage), the system magnification, and the conversion between stage position and power of equivalent defocus in diopters when the stage positions are varied.

Figure 7:
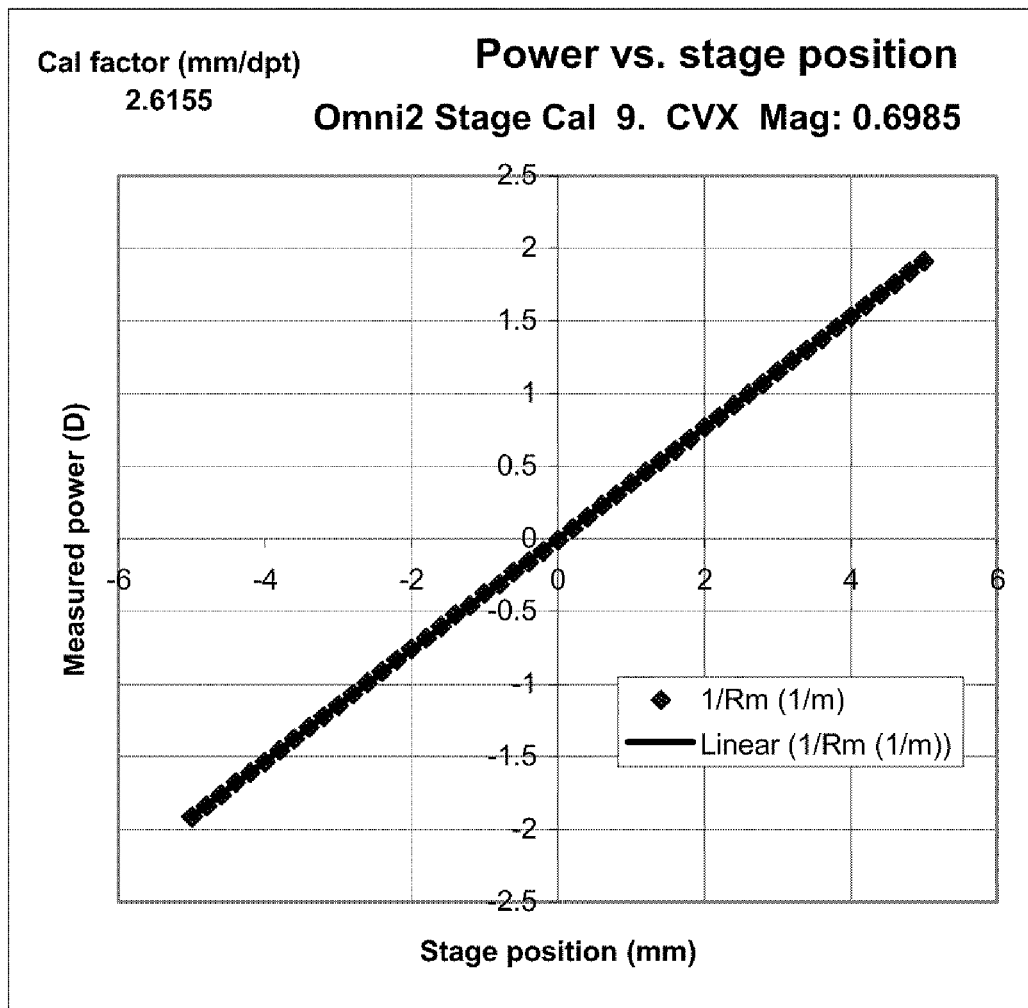
FIG. 7 shows the measured refractive power (wavefront curvature) as a function of stage 1 position.

FIG. 7 illustrates an example of a determination of a cal factor, $C_1$, for the stage 105. FIG. 7 plots measured refractive power (wavefront curvature) as a function of stage 1 position (stage 105). This curve is linear, with a slope 0.3823 diopter/mm. The stage cal factor of 2.6155 mm/diopter allows the stage position to be used to correct the optical wavefront by a known systematic curvature. For any stage position $Z_1$, the wavefront curvature $1/R_1$ can be determined by just multiplying the stage position by the cal factor: $1/R_1 = Z_1 C_1$. So, $C_1$ is used to determine the correct wavefront curvature to add to the measured wavefront during the focal stitching process as described by Eqn. 4.

Other factors may determined by systematic variation of the other stages as appropriate.

One of the key parameters that needs to be determined for proper analysis and calibration of the system is the focal length of the various lenses. While there are a number of different techniques for determining the focal length of a lens, many of these techniques require a subjective evaluation. Other techniques rely on mechanical measurements of the lens surface, which make it difficult to account for index of refraction variations or aberrations. Even image-based techniques rely on determination of best focus to determine the focal properties of the lens. For lenses with variations this leads to inaccuracies in determining the focal length.

Figure 11:
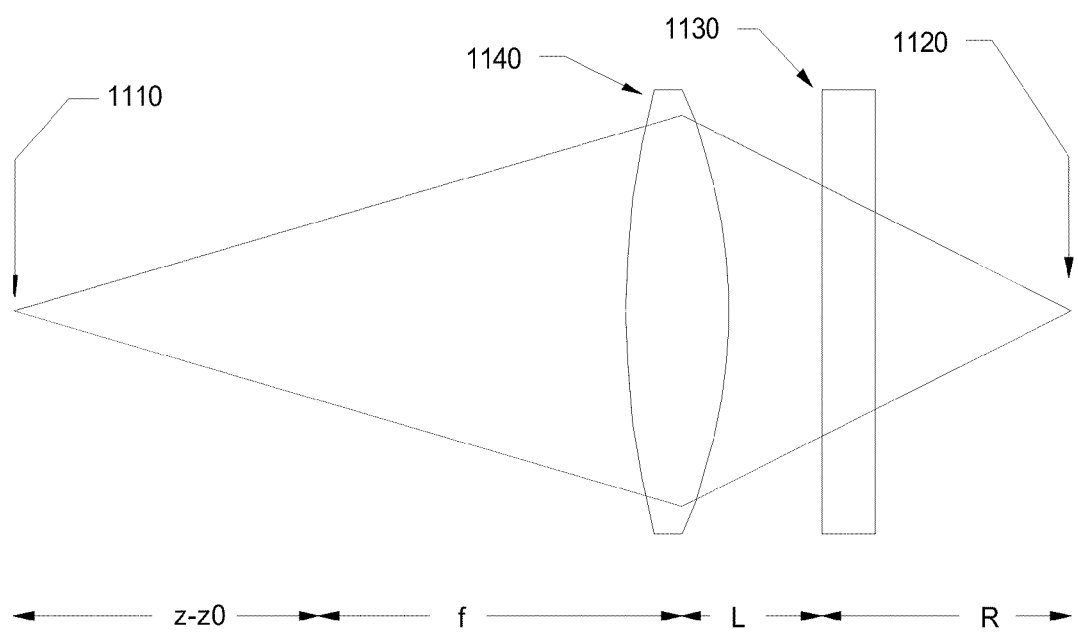
FIG. 11 shows the parameters needed for measuring the focal parameters of a lens.

The wavefront sensor described previously can measure the radius of curvature of an incident wave. This can be used to determine the focal properties of a lens in the following manner, as explained with respect to FIG. 11. FIG. 11 illustrates the geometry for measuring lens focal lengths and other properties of lenses using a wavefront sensor. In FIG. 11, a lens to be tested 1140 is arranged between a point source 1110 and a wavefront sensor 1130. The lens 1140 collects the light from the source 1110 and directs it toward the sensor 1130. The sensor 1130 measures the wavefront of the light incident upon it, including the wavefront curvature. The focal length is a paraxial property of the lens 1140. That is, the focal length is the distance that the lens 1140 will focus the near on-axis (paraxial) rays from a collimated source. The focal length is related to the object and image positions by the thin-lens formula:

$$\frac{1}{f} = \frac{1}{S_o} + \frac{1}{S_i} \quad (13)$$

With the wavefront sensor 1130 arranged as shown in FIG. 11, the parameters $S_o$ and $S_i$ can be replaced with the appropriate quantities from the optical geometry:

$$\frac{1}{f} = \frac{1}{f + Z - Z_0} + \frac{1}{L + R} \quad (14)$$

which can be rewritten in terms of the measured vergence at the wavefront sensor $P = 1/R$:

$$P = \frac{1}{R} = \frac{Z - Z_0}{f^2 + (f - L)(Z - Z_0)}. \quad (15)$$

where $(Z-Z_0)$ is the relative position of the source (Z) with respect to its position at collimation $(Z_0)$, f is the lens focal length of lens 1140, and L is the distance between the lens 1140 and wavefront sensor 1130. This formula expresses the relationship between the position of a point source 1110 and the measured power (1/R) of the wavefront incident on the wavefront sensor 1130. If the source 1110 is located on a moving stage that allows for precise variation of its position in a known fashion, e.g. through the use of a motorized stage with encoder position feedback (such as in the system 100 of FIG. 1A), then a data set of measured power P as a function of source positions can be obtained. This data can be analyzed to determine the parameters f, L, and $Z_0$ that provide the best fit to Eqn. 15. A least squares, bisection, iterative or other numerical method can be employed.

Figure 12:
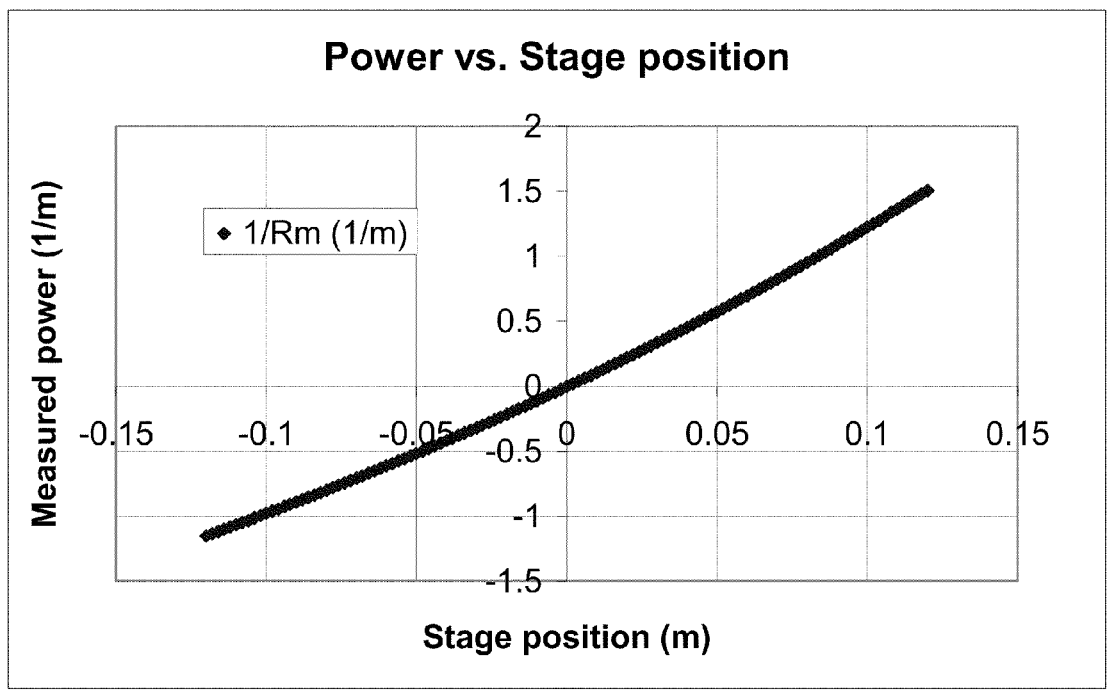
FIG. 12 shows example data from the measurement of lens focal properties.

FIG. 12 illustrates measurement of the focal power (P=1/R) as a function of stage position over a range of positions. Analysis of this curve allows the determination of the lens focal length and other properties. FIG. 12 presents an example, which shows the measured power (in diopters) as a function of stage position over a +/−0.12 m range. Analysis of this data yields f=301.52 mm, L=405.65 mm, and $Z_0$=0.21 mm.

The analysis of paired object/image location data is well known in the prior art. For example, Pernick et al., "Least-squares technique for determining principal plane location and focal length," Appl. Optics 26(15), pp. 2938-2939 (1 Aug. 1987) showed that lens focal lengths could be determined through measurements of paired data and a least squares fitting routine.

However, in the prior art the image position is determined by examining the image and finding the position that results in best focus. This is difficult for an aberrated lens, or for one with a long focal length. In the case of an aberrated lens there is no single clear position for best focus, and for a long focal length lens there is a long region where the image appears to have similar quality because of the large depth of focus for such a lens. In contrast to the prior art, in this method a wavefront sensor (Shack-Hartmann, Moire deflectometry, holographic grating, shearing interferometer, etc.) is employed. This wavefront sensor can be used to describe the incident wavefront through a polynomial decomposition, such as Taylor polynomials, Zernike polynomials or other orthogonal or non-orthogonal basis. The advantage of using an orthogonal basis (such as Zernike polynomials) is that the paraxial effects (such as the paraxial focal power) can be separated from other phenomenon or aberrations. Thus by analyzing only the second order polynomial terms, one can analyze the paraxial focal power term separately from the higher order terms, such as spherical aberrations. This effectively allows the analysis of only the paraxial properties, even in the presence of other aberrations. Also, the wavefront determination can be quite accurate, even for extremely large radius of curvature wavefronts. For example, Shack-Hartmann wavefront sensors have been shown to be capable of accurately measuring wavefronts having radii of curvature >1000 m, over a 5 mm aperture. This accuracy allows the measurement of even long focal length lenses that would be difficult using the past.

Although the specific example discussed above pertains to a case where the absolute position of the device under test (e.g., lens) remains constant while the light source is moved by the movable stage to obtain N data samples for the least-squares-mean algorithm, it is also possible to move the device under test (e.g., lens) by a movable stage while the light source remains fixed, to obtain the N data samples.

One common element that is needed for measuring parts using these methods is a point source that is used to provide an accurate spherical wave. Such a point source may be constructed using a variety of different methods. In the prior art a number of methods have been used for such a purpose. These include focusing light through a small pinhole, the use of a small optical fiber, or LED. However, each of these methods has serious disadvantages that may preclude its use in some situations. Focusing light through a pinhole requires accurate and difficult alignment. The numerical aperture from an optical fiber is limited to relatively low values (<0.11), and an LED may have internal structure that complicate the optical wavefront so that it does not present a perfect spherical wave.

Figure 10A:
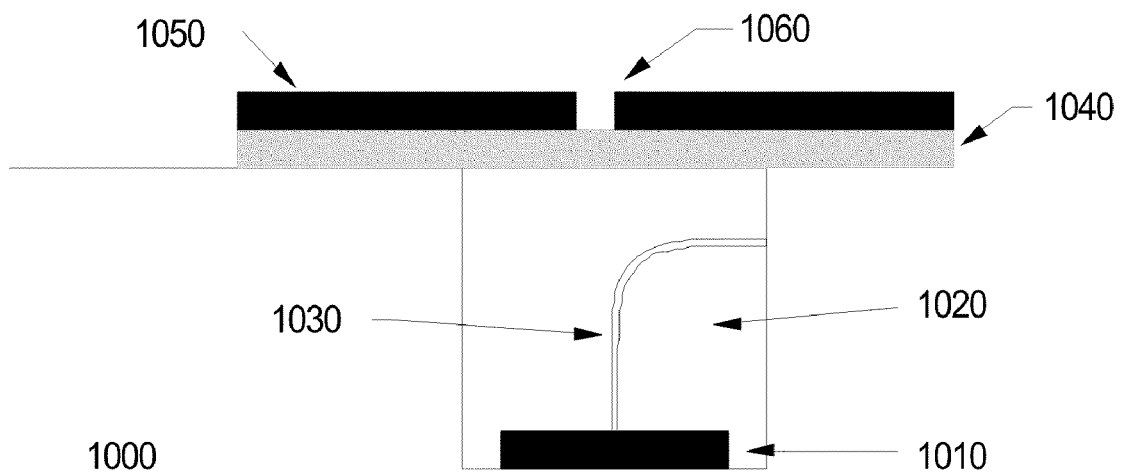
FIG. 10A shows an arrangement of elements to produce a point source that can be used for transmissive or reflective optical measurements.

FIG. 10A illustrates a device for producing a nearly spherical wavefront that overcomes these advantages. This device uses a standard LED, which is very low cost and yet may provide a significant amount of light power. The LED consists of emitter 1010, with contact wire 1030, that are protected inside an epoxy well structure 1020. If only the LED is used as a source, then the contact wire and well structure cause three-dimensional patterns of the emitted light waveform that complicate its use as a spherical wave source. By including the additional elements of a diffuser 1040 and pinhole structure 1050 with aperture 1060 these disadvantages may be overcome. The diffuser 1040 may be made of a thin piece of Teflon or other appropriate material.

Beneficially, when a Shack-Hartmann wavefront sensor is employed, the aperture 1060 does not need to be extremely small, since it will end up being imaged onto the detector array. The size of the effective focal spot may be arranged to grow by only a small amount. However, it may be advantageous to arrange a slightly larger spot in any case, since covering more pixels will lead to better measurement accuracy (as shown for example by D. R. Neal et al., "Shack-Hartmann wavefront sensor precision and accuracy," SPIE 4779, 2002).

The disadvantage to this configuration is that the efficiency is very low. The aperture 1060 passes only a small amount of light, and this if further reduced by the diffuser 1040.

Figure 10B:
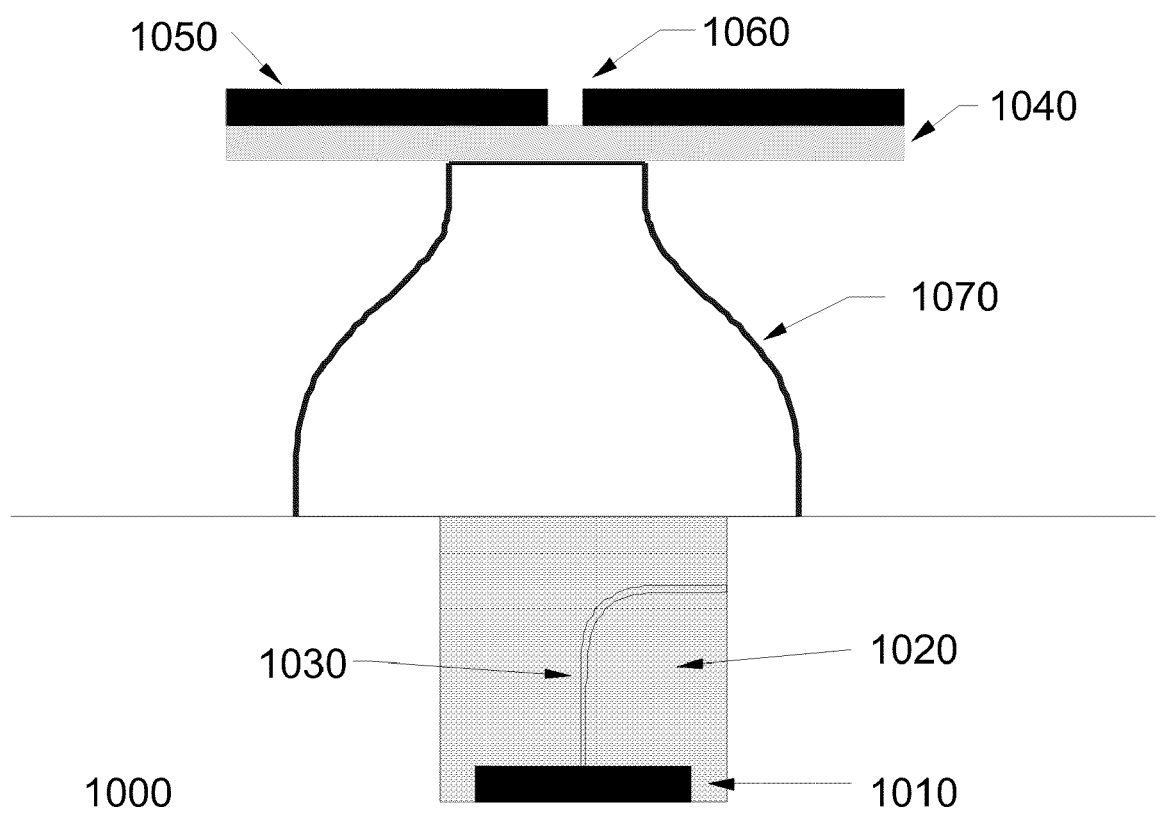
FIG. 10B shows an arrangement of elements to produce a point source of light with high power for optical metrology measurements

The light efficiency may be improved by using the configuration shown in FIG. 10B. In this case, a tapered fiber 1070 (or alternatively a tapered fiber bundle) is introduced between the LED and the diffuser/pinhole elements 1040/1060. The tapered fiber 1070 collects the light from the LED, concentrates it, and provides it to the diffuser 1060 and pinhole 1070.

While preferred embodiments are disclosed herein, many variations are possible which remain within the concept and scope of the invention. Such variations would become clear to one of ordinary skill in the art after inspection of the specification, drawings and claims herein. The invention therefore is not to be restricted except within the spirit and scope of the appended claims.

We claim:

1. A system, comprising:
    a projecting optical system adapted to project light onto an object;
    a pre-correction system adapted to compensate a light beam to be projected onto the object for at least one aberration in the object, the pre-correction system being positioned in between the projecting optical system and the object and comprising a telescope having two lenses, at least one of the lenses being movable;
    an imaging system adapted to collect light scattered by the object;
    a wavefront sensor adapted to receive the light collected by the imaging system and to sense a wavefront of the received light;
    means for adjusting the compensation applied to the light beam by the pre-correction system to thereby change the wavefront of the light received by the wavefront sensor;
    means for stitching together the sensed wavefronts of the light received by the wavefront sensor for each compensation to map a surface of the object; and
    a dynamic range limiting aperture disposed in an optical path between the two lenses and being adapted to insure that the wavefront sensor only sees light within a dynamic range of the system;
    wherein the means for stitching further comprises a processor, the processor further being adapted to move the movable lens to a plurality of positions and to stitch together the sensed wavefronts of the light received by the wavefront sensor at each of the positions.

2. The system of claim 1, wherein the wavefront sensor is a Shack-Hartmann wavefront sensor.

3. A system, comprising:
    a projecting optical system adapted to project light onto an object;
    a pre-correction system comprising telescope having two lenses, at least one of the lenses being movable, the pre-correction system adapted to compensate a light beam to be projected onto the object for at least one aberration in the object without reflecting the light beam, the pre-correction system being positioned in between the projecting optical system and the object;
    an imaging system adapted to collect light scattered by the object;
    a wavefront sensor adapted to receive the light collected by the imaging system and to sense a wavefront of the received light;
    a dynamic-range-limiting aperture disposed in an optical path between the two lenses and being adapted to insure that the wavefront sensor only sees light within a dynamic range of the system;
    means for adjusting the compensation applied to the light beam by the pre-correction system to thereby change the wavefront of the light received by the wavefront sensor; and
    means for stitching together the sensed wavefronts of the light received by the wavefront sensor for each compensation to map a surface of the object, the means for stitching comprising a processor adapted to move the movable lens to a plurality of positions and to stitch together the sensed wavefronts of the light received by the wavefront sensor at each of the positions.

4. The system of claim 3, wherein the wavefront sensor is a Shack-Hartmann wavefront sensor.

* * * * *